(12) United States Patent
Nagato et al.

(10) Patent No.: US 11,468,261 B2
(45) Date of Patent: Oct. 11, 2022

(54) INFORMATION PROCESSING APPARATUS, IMAGE PROCESSING METHOD, AND COMPUTER-READABLE RECORDING MEDIUM RECORDING IMAGE PROCESSING PROGRAM

(71) Applicant: FUJITSU LIMITED, Kawasaki (JP)

(72) Inventors: Tsuyoshi Nagato, Isehara (JP); Hiroaki Okamoto, Atsugi (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 1125 days.

(21) Appl. No.: 16/034,969

(22) Filed: Jul. 13, 2018

(65) Prior Publication Data
US 2018/0322364 A1    Nov. 8, 2018

Related U.S. Application Data

(63) Continuation of application No. PCT/JP2016/051519, filed on Jan. 20, 2016.

(51) Int. Cl.
*G06T 11/60*     (2006.01)
*G06N 20/00*     (2019.01)
(Continued)

(52) U.S. Cl.
CPC ......... *G06K 9/6229* (2013.01); *G06K 9/6262* (2013.01); *G06N 3/126* (2013.01); *G06V 10/751* (2022.01)

(58) Field of Classification Search
CPC .... G06K 9/6229; G06K 9/6262; G06N 3/126; G06V 10/751

(Continued)

(56) References Cited

U.S. PATENT DOCUMENTS

| 6,668,084 B1 * | 12/2003 | Minami | G06V 30/248 |
| | | | 382/103 |
| 2010/0027892 A1 * | 2/2010 | Guan | G06V 10/7515 |
| | | | 382/203 |

(Continued)

FOREIGN PATENT DOCUMENTS

| JP | 2002-73076 | 3/2002 |
| JP | 2008-507372 | 3/2008 |

(Continued)

OTHER PUBLICATIONS

Japanese Office Action dated Jul. 30, 2019 in corresponding Japanese Patent Application No. 2017-562208.

(Continued)

*Primary Examiner* — Brandon S Cole
(74) *Attorney, Agent, or Firm* — Staas & Halsey LLP

(57) ABSTRACT

An information processing apparatus includes: a memory configured to store an image processing program having a tree structure in which a partial program is incorporated in each of a plurality of nodes; and a processor configured to performs, based on the image processing program, operations of; calculating a feature amount based on a processing result in each intermediate node excluding a terminal node among the plurality of nodes when executing image processing on a captured image which is captured by an imaging device; and calculating a performance evaluation value of the image processing program based on a variation amount of the feature amount in accordance with elapse of time.

8 Claims, 19 Drawing Sheets

(51) Int. Cl.
*H04L 51/00* (2022.01)
*G06K 9/62* (2022.01)
*G06V 10/75* (2022.01)
*G06N 3/12* (2006.01)

(58) Field of Classification Search
USPC .......................................................... 706/1–62
See application file for complete search history.

(56) References Cited

U.S. PATENT DOCUMENTS

| | | | |
|---|---|---|---|
| 2011/0131158 A1* | 6/2011 | Furukawa .............. | G06N 20/20 706/12 |
| 2012/0243779 A1 | 9/2012 | Nakai et al. | |
| 2015/0186422 A1 | 7/2015 | Sumitomo | |
| 2015/0186748 A1* | 7/2015 | Cootes ................. | G06K 9/6282 382/201 |
| 2015/0287160 A1 | 10/2015 | Nagato et al. | |

FOREIGN PATENT DOCUMENTS

| | | |
|---|---|---|
| JP | 2006-293820 | 10/2008 |
| JP | 2012-203634 | 10/2012 |
| JP | 5541426 | 7/2014 |
| JP | 2015-64625 | 4/2015 |
| WO | WO 2006/013514 A1 | 2/2006 |
| WO | WO 2014/104151 A1 | 7/2014 |

OTHER PUBLICATIONS

S. Aoki et al., "ACTIT: Automatic Construction of Tree-structural Image Transformations", the Journal of the Institute of Information and Television Engineers, vol. 53, No. 6, pp. 888-894, Jun. 1999.
International Search Report dated Apr. 19, 2016 in corresponding International Patent Application No. PCT/JP2016/051519.
Written Opinion of International Searching Authority dated Apr. 19, 2016 in corresponding International Patent Application No. PCT/JP2016/051519.

* cited by examiner

FIG. 4
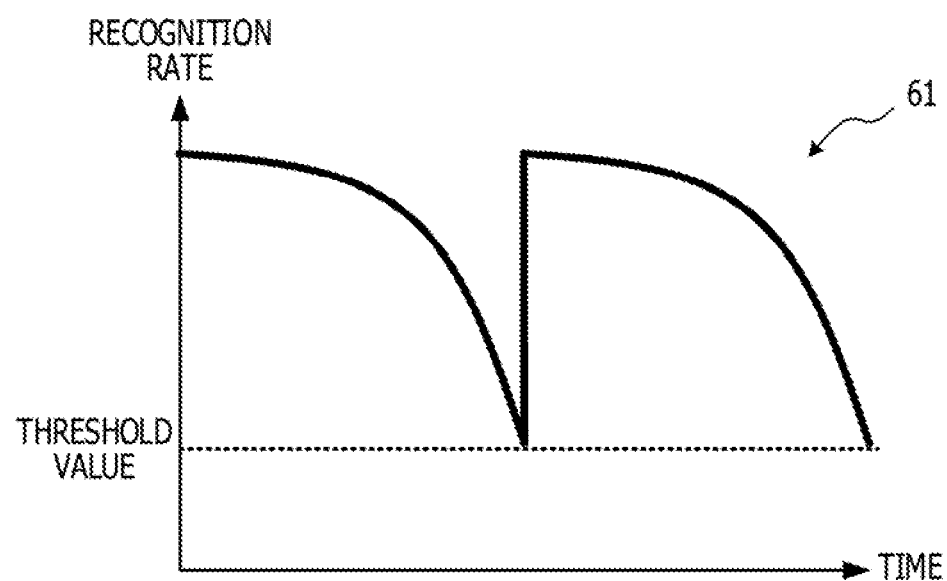
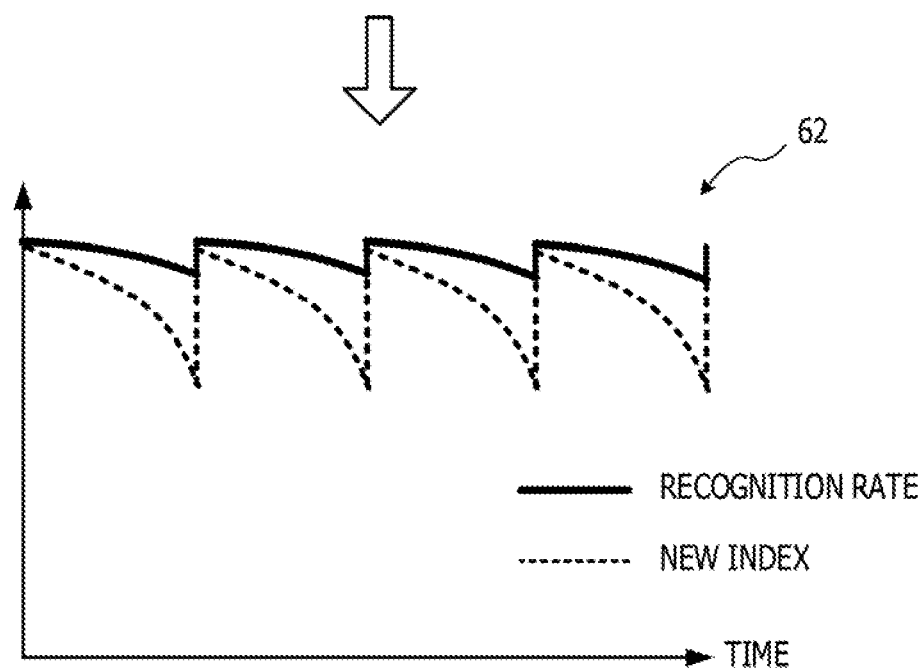

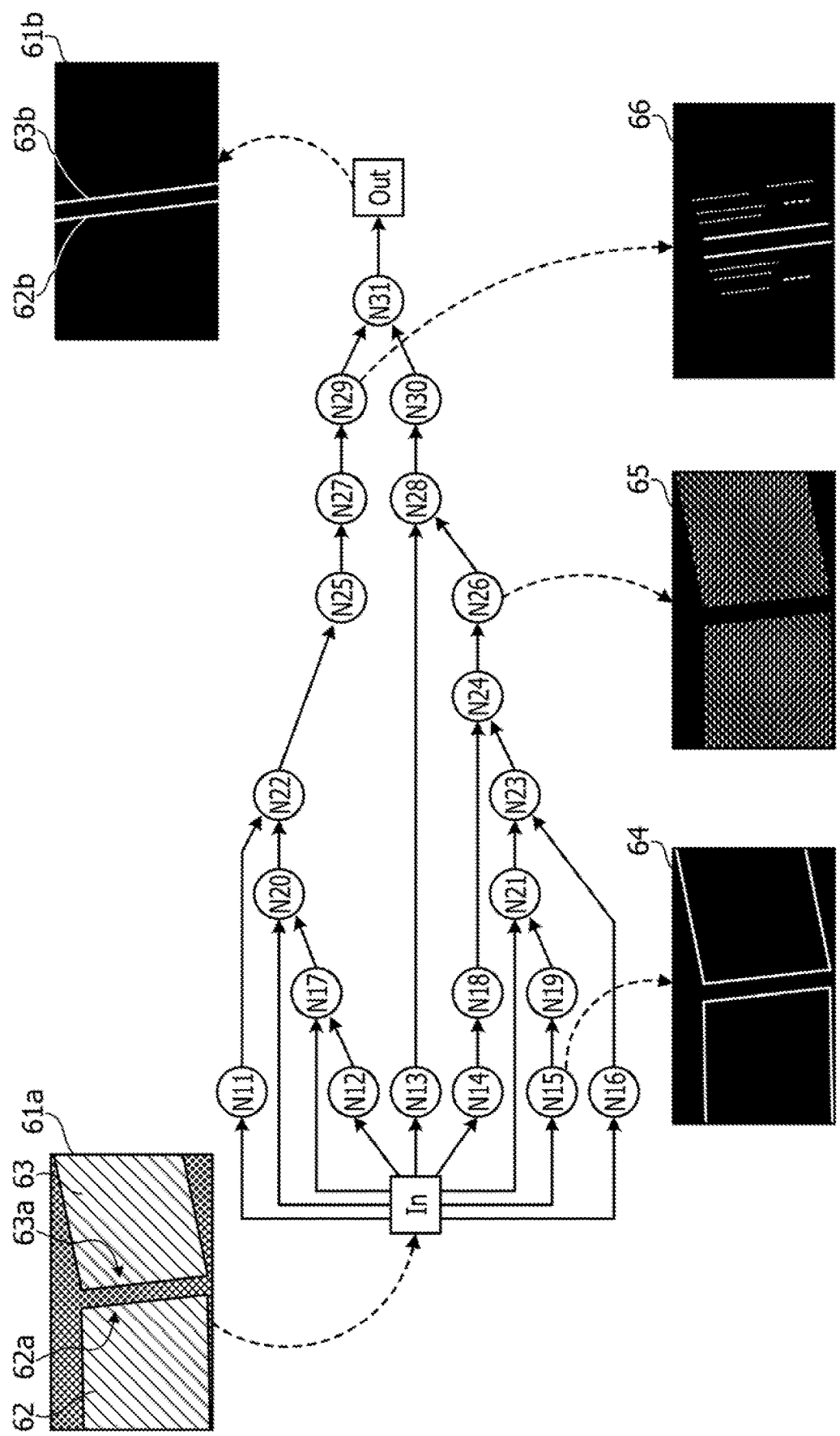

FIG. 6

| KIND OF PARTIAL PROGRAM | NODE FEATURE AMOUNT |
|---|---|
| Smooth FILTER | AVERAGE LUMINANCE |
| Sobel FILTER | MAXIMUM VALUE, MINIMUM VALUE |
| Laplace FILTER | MAXIMUM VALUE, MINIMUM VALUE |
| Inverse FILTER | AVERAGE LUMINANCE |
| Sub FILTER | NUMBER OF PIXELS WHOSE PIXEL VALUE IS POSITIVE NUMBER OF PIXELS WHOSE PIXEL VALUE IS NEGATIVE |
| Add FILTER | NUMBER OF PIXELS WHOSE PIXEL VALUE IS EQUAL TO OR LARGER THAN PREDETERMINED VALUE |
| Diff FILTER | NUMBER OF PIXELS WHOSE PIXEL VALUE IS 0 |
| Threshold FILTER | NUMBER OF WHITE PIXELS |
| Erode FILTER | REDUCTION AMOUNT OF WHITE PIXELS |
| Dilate FILTER | INCREASE AMOUNT OF WHITE PIXELS |
| And FILTER | NUMBER OF WHITE PIXELS |
| Or FILTER | NUMBER OF WHITE PIXELS |

INFORMATION PROCESSING APPARATUS, IMAGE PROCESSING METHOD, AND COMPUTER-READABLE RECORDING MEDIUM RECORDING IMAGE PROCESSING PROGRAM

CROSS-REFERENCE TO RELATED APPLICATION(S)

This application is a continuation application of International Application PCT/JP2016/051519 filed on Jan. 20, 2016 and designated the U.S., the entire contents of which are incorporated herein by reference.

FIELD

The embodiment relates to an information processing apparatus, an image processing method, and a computer-readable recording medium recording an image processing program.

BACKGROUND

A technique for automatically generating, by genetic programming, an image processing program for executing desired image processing has been drawing an attention. This technique is a technique that an image processing program, which is generated by combining partial programs for image processing, is optimized through genetic programming by using an input image and a target processing result (a target image, for example).

A related art is disclosed in Japanese Laid-open Patent Publication No. 2006-293820 or Shinya Aoki and Tomoharu Nagao, "ACTIT: Automatic construction of tree-structural image transformations", the Journal of the Institute of Information and Television Engineers, Vol. 53, No. 6, Jun. 20, 1999, pp. 890-892.

SUMMARY

According to one aspect of the embodiments, an information processing apparatus includes: a memory configured to store an image processing program having a tree structure in which a partial program is incorporated in each of a plurality of nodes; and a processor configured to performs, based on the image processing program, operations of; calculating a feature amount based on a processing result in each intermediate node excluding a terminal node among the plurality of nodes when executing image processing on a captured image which is captured by an imaging device; and calculating a performance evaluation value of the image processing program based on a variation amount of the feature amount in accordance with elapse of time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a graph illustrating transition of a recognition rate.

FIG. 5 is a diagram illustrating calculation of an index for evaluating necessity of program regeneration.

FIG. 6 is a diagram illustrating an example of a calculation method of a node feature amount corresponding to a kind of a partial program.

DESCRIPTION OF EMBODIMENT

For example, the following appearance inspection device has been proposed as an example of a technique related to generation of an image processing algorithm. This appearance inspection device executes appearance inspection of an inspection object by using a generated algorithm and calculates an evaluation value based on the inspection result so as to determine necessity of relearning of the algorithm depending on whether the evaluation value satisfies a predetermined condition.

In execution of image processing using an image processing program that is generated by genetic programming, image processing precision degrades as conditions, such as an environment in which an image of an image processing object is captured and specifications of an imaging object, are changed. Therefore, at a time point on which it is determined that desired image processing precision is not able to be maintained, relearning of the image processing program is performed by adding an input image, which is obtained by performing imaging in a manner that the imaging environment or the imaging object is changed, and its target processing result.

However, it is impossible to execute the image processing using the image processing program until a new image processing program is generated by the relearning. For example, in the case where an image processing program is used for performing positioning or inspection of components on a product manufacturing line, an operation of the manufacturing line has to be suspended until a new image processing program is generated by relearning. Therefore, how early timing, at which relearning of the image processing program has to be performed, is able to be determined before image processing precision remarkably degrades is a problem.

An image processing device, an image processing method, and an image processing program which enable detection of signs of precision degradation in image processing based on an image processing program may be provided.

Embodiments will be described below with reference to the accompanying drawings.

First Embodiment

Figure 1:
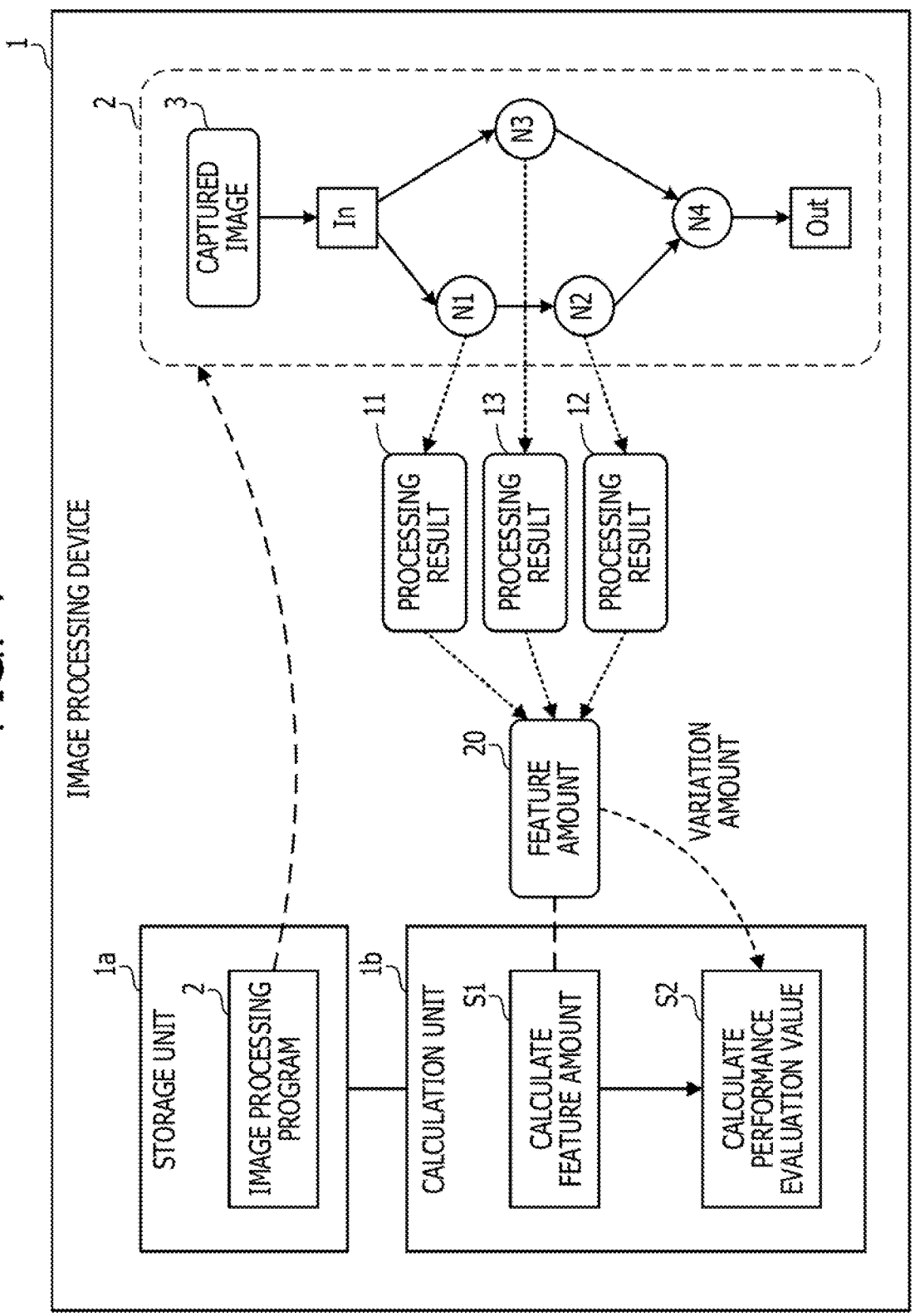
FIG. 1 is a diagram illustrating a configuration example and a processing example of an image processing device according to a first embodiment.

FIG. 1 is a diagram illustrating a configuration example and a processing example of an image processing device according to a first embodiment. The image processing device 1 includes a storage unit 1a and a calculation unit 1b. The storage unit 1a is a storage device such as a random access memory (RAM) and a hard disk drive (HDD), for example. The calculation unit 1b is a processor, for example.

In the storage unit 1a, an image processing program 2 is stored. The image processing program 2 has a tree structure in which a partial program is incorporated in each of a plurality of nodes. Further, the image processing program 2 is generated by using genetic programming. In generation of the image processing program 2 by genetic programming, learning is performed by using one or more sets of learning data each of which includes an input image and target data. The configuration of the nodes in the tree structure and a partial program which is to be incorporated in each of the nodes are optimized through the learning.

In the example of FIG. 1, the image processing program 2 includes nodes N1 to N4. When the calculation unit 1b executes the image processing program 2 by using a captured image 3 as an input, the following processing is executed. Here, the captured image 3 is an image captured by an imaging device which is not illustrated.

In the node N1, processing with respect to the captured image 3 which is inputted in an input terminal In is executed in accordance with a partial program incorporated in the node N1 and a processing result 11 is outputted. In the node N2, processing with respect to the processing result 11 is executed in accordance with a partial program incorporated in the node N2 and a processing result 12 is outputted. In the node N3, processing with respect to the captured image 3 which is inputted in the input terminal In is executed in accordance with a partial program incorporated in the node N3 and a processing result 13 is outputted. In the node N4, processing with respect to the processing results 12 and 13 is executed in accordance with a partial program incorpo-rated in the node N4. The node N4 is a terminal node and a processing result in the node N4 is outputted from an output terminal Out.

The calculation unit 1b executes the image processing program 2 by using the captured image 3, which is acquired from the imaging device which is not illustrated, as an input. Whenever the calculation unit 1b executes image processing in accordance with the image processing program 2, the calculation unit 1b calculates a feature amount 20 based on the processing results 11 to 13 of intermediate nodes excluding the terminal node among the nodes N1 to N4, that is, the nodes N1 to N3 (step S1).

For example, the feature amount 20 is calculated as a combination of node feature amounts which are calculated based on respective processing results 11 to 13. In the case where the processing results 11 to 13 are obtained as images, an average value of luminance in each image is calculated as a node feature amount, for example. Further, a node feature amount may be calculated by a calculation method which differs depending on a kind of a partial program incorporated in each intermediate node.

The calculation unit 1b calculates a performance evaluation value of the image processing program 2 based on a variation amount, which corresponds to elapse of time, of the calculated feature amount 20 (step S2). The variation amount is calculated as a distance between an initial feature amount, which is calculated at the time of generation of the image processing program 2, and the current feature amount 20, for example. Alternatively, a variation range in feature amounts, which are respectively calculated when the image processing program 2 is executed the last predetermined number of times, may be calculated as a variation amount.

Here, in generation of the image processing program 2, learning is performed by using learning data corresponding to prediction of change of an imaging environment or change of specifications of an imaging object, whereby the image processing program 2 exhibiting high robustness is generated. However, when time elapses after the start of an operation using the image processing program 2, change of an imaging environment or change of specifications of an imaging object, which is not predicted at the time of the generation of the image processing program 2, sometimes occurs. In this case, precision in image processing based on the image processing program 2 degrades. Here, the precision in image processing represents how close a processing result with respect to a captured image is to a result desired by a user of the image processing program 2.

As a determination method of image processing precision, there is a method of determination based on a final processing result, which is obtained by using the image processing program 2, with respect to a captured image. However, the image processing program 2 has to be regenerated at the time when it is determined that image processing precision is low based on a final processing result, so that an operation using the image processing program 2 has to be suspended.

On the other hand, a processing result based on the image processing program 2 in an intermediate node is largely affected by change of an imaging environment or state change of an imaging object, compared to a final processing result in a terminal node. This is because partial programs incorporated in intermediate nodes include a partial program for extracting a feature from an image so as to obtain a final result of image processing and a feature to be extracted may largely vary depending on change of an imaging environment or state change of an imaging object. Therefore, change of an imaging environment or state change of an imaging object is sensitively captured by using a variation amount of a feature amount based on processing results in intermediate nodes.

That is, use of a performance evaluation value that is calculated based on a variation amount of the feature amount enables detection of signs of precision degradation and determination of necessity in regeneration of the image processing program 2 before precision in image processing based on the image processing program 2 largely degrades. Accordingly, it is possible to add new learning data corresponding to change of an imaging environment or state change of an imaging object and regenerate the image processing program 2 while continuing an operation using the image processing program 2 in a state that a certain level of image processing precision is maintained.

Second Embodiment

An image processing device that has a function for generating an image processing program by using genetic programming in addition to the determination function provided to the image processing device 1, which is illustrated in FIG. 1, will now be described as a second embodiment.

Figure 2:
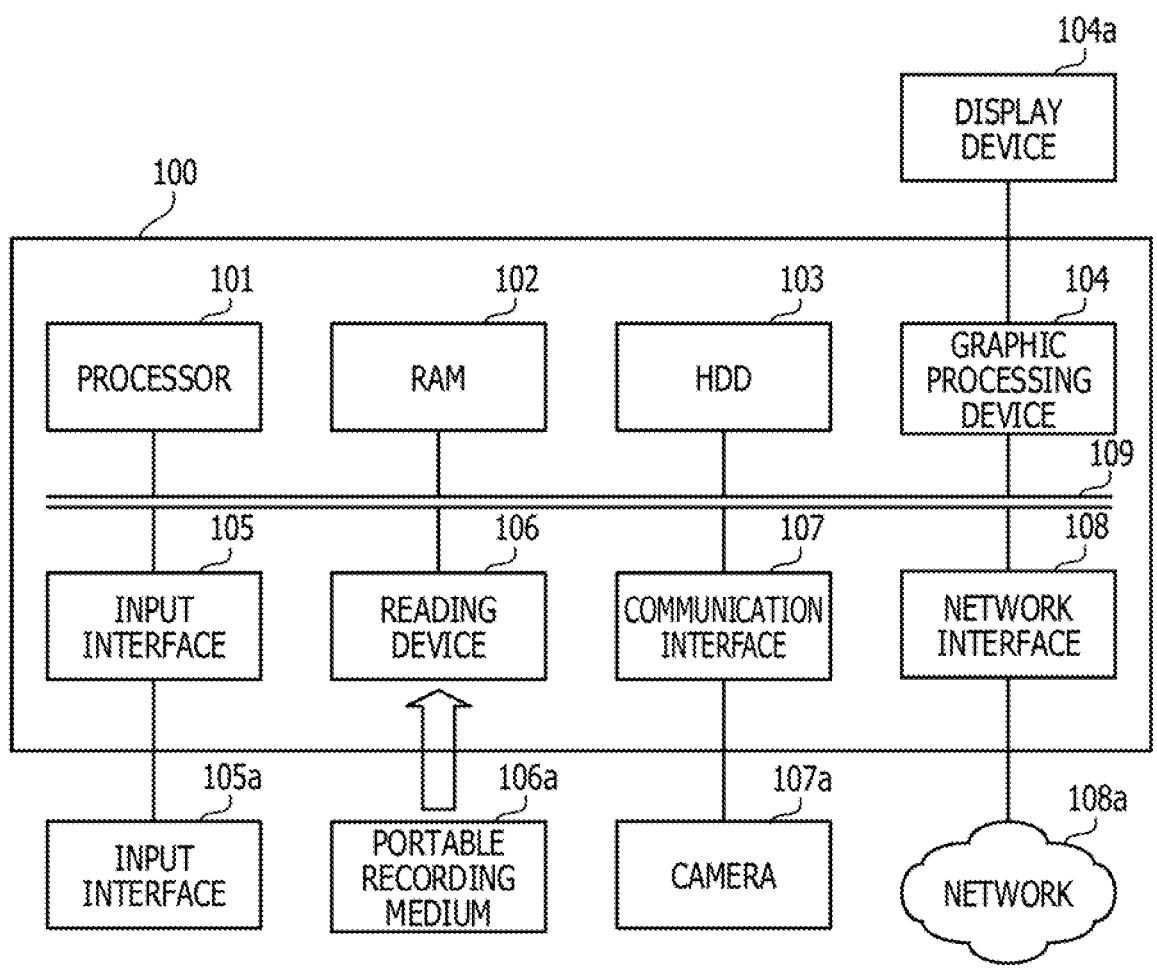
FIG. 2 is a diagram illustrating a hardware configuration example of an image processing device according to a second embodiment.

FIG. 2 is a diagram illustrating a hardware configuration example of an image processing device according to the second embodiment. An image processing device 100 according to the second embodiment is realized as a computer illustrated in FIG. 2, for example.

The whole image processing device 100 is controlled by a processor 101. The processor 101 may be a multiprocessor. The processor 101 is a central processing unit (CPU), a micro processing unit (MPU), a digital signal processor (DSP), an application specific integrated circuit (ASIC), or a programmable logic device (PLD), for example. Alternatively, the processor 101 may be a combination of two or more elements among the CPU, the MPU, the DSP, the ASIC, and the PLD.

To the processor 101, a RAM 102 and a plurality of peripheral devices are connected via a bus 109.

The RAM 102 is used as a main storage device of the image processing device 100. In the RAM 102, at least a part of an operating system (OS) program or an application program to be executed by the processor 101 is temporarily stored. Further, various types of data for processing by the processor 101 are stored in the RAM 102.

Examples of the peripheral devices connected to the bus 109 include an HDD 103, a graphic processing device 104, an input interface 105, a reading device 106, a communication interface 107, and a network interface 108.

The HDD 103 is used as an auxiliary storage device of the image processing device 100. In the HDD 103, an OS program, an application program, and various types of data are stored. Here, other kinds of non-volatile storage device such as a solid state drive (SSD) may be used as the auxiliary storage device.

To the graphic processing device 104, a display device 104a is connected. The graphic processing device 104 displays an image on a screen of the display device 104a in accordance with a command from the processor 101. Examples of the display device include a liquid crystal display and an organic electroluminescence (EL) display.

To the input interface 105, an input device 105a is connected. The input interface 105 transmits a signal outputted from the input device 105a to the processor 101. Examples of the input device 105a include a keyboard and a pointing device. Examples of the pointing device include a mouse, a touch panel, a tablet, a touch pad, and a track ball.

To and from the reading device 106, a portable recording medium 106a is attached and detached. The reading device 106 reads data recorded in the portable recording medium 106a and transmits the data to the processor 101. Examples of the portable recording medium 106a include an optical disk, a magnetooptical disk, and a semiconductor memory.

The communication interface 107 performs transmission and reception of data with a connected external device. In the present embodiment, a camera 107a is connected as the external device to the communication interface 107 and the communication interface 107 transmits image data transmitted from the camera 107a to the processor 101.

The network interface 108 performs transmission and reception of data with other devices via a network 108a.

The processing functions of the image processing device 100 may be realized by the above-described hardware configuration.

Here, the image processing device 100 has a function for generating an image processing program by genetic programming as described above. In this generation processing, an image processing program is defined by a tree structure and a partial program is incorporated in each node. Then, the configurations of nodes in the tree structure and the partial program to be incorporated in each of the nodes are optimized through learning using learning data that includes an input image and a target processing result (a target image, for example).

Further, examples of image processing realized by an image processing program include edge detection, region detection, and template matching. In these image processing, images of which a specific edge, a specific region, and a region of a template image in an input image are represented by specific pixel values are outputted, for example. In this case, such output images are set as a target image included in learning data. Further, in the above-described image processing, position information of a specific edge, a specific region, and a region of a template image in an input image, for example, may be outputted. In this case, the position information is set as target data included in learning data.

As an example of an application of such image processing program, such application is conceivable that image processing is performed with respect to an image, which is obtained by imaging a product, so as to obtain a desired effect in a field of factory automation (FA). For example, an application is conceivable, the application in which image processing is performed with respect to an image, which is obtained by imaging an outer appearance of a product, so as to extract a part on which a defect is generated, extract a part on which positioning is to be performed, or determine whether or not a specific component is mounted.

In such application, an image processing algorithm may have to be reconstructed in accordance with change or improvement of a product which is an imaging object, change of an imaging environment corresponding to the change or improvement of the product, and the like. Therefore, easiness in construction of an image processing algorithm is desired. Further, it is desired to construct an image processing algorithm exhibiting high robustness with respect to change of an illumination condition, change of a shape of an imaging object, and state change such as variation in position attitudes.

Through use of genetic programming, it is possible to easily generate an image processing program applicable in such application only by preparing an input image and target data corresponding to this input image in advance. Further, it is also possible to automatically generate an image processing algorithm exhibiting high robustness with respect to change of an imaging environment or state change of an imaging object by preparing a plurality of pairs (learning data) of an input image and target data which are respectively obtained in different imaging environments or in different states of an imaging object.

Figure 3:
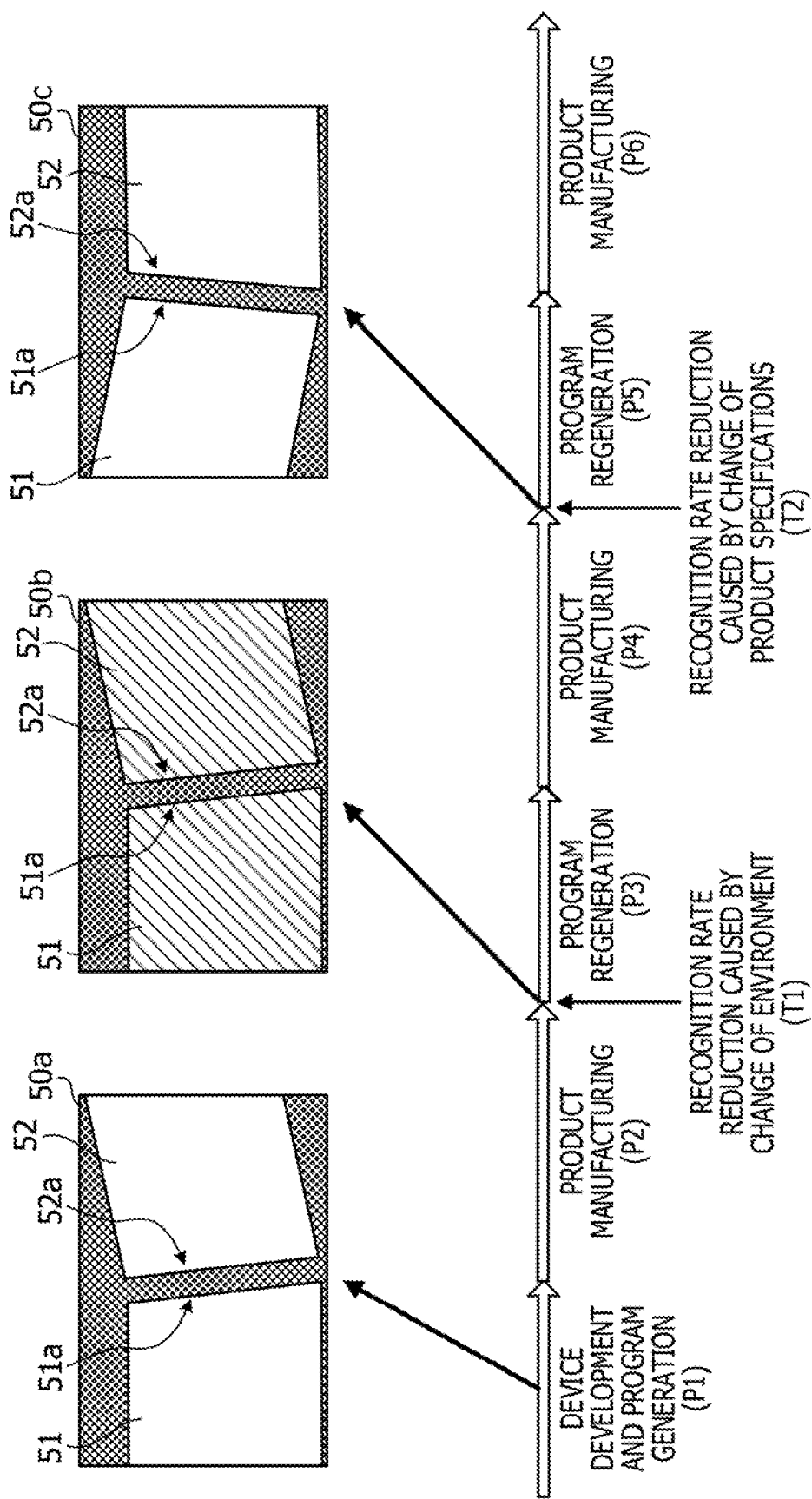
FIG. 3 is a diagram illustrating an example of timing of regeneration of an image processing program.

Here, FIG. 3 is a diagram illustrating an example of timing for regeneration of an image processing program. As a method for determining timing at which an image processing program has to be regenerated, a method using image processing precision based on a final processing result of image processing is conceivable. In FIG. 3, processing for detecting a position of a specific part on an imaging object is assumed as an example of image processing and a recognition rate representing a rate at which the position of the specific part is correctly detected is illustrated as an example of an index representing image processing precision.

For example, a manufacturing device for manufacturing a certain product is assumed to be developed. In this case, an image processing program used in the manufacturing device is also generated in a development period (period P1) of the manufacturing device. In the generation of the image processing program, a captured image 50a in which components 51 and 52 to be mounted on a product are imaged, for example, is used as one of input images of learning data. Further, respective positions of an edge 51a of the component 51 and an edge 52a of the component 52 in the captured image 50a are used as corresponding target data.

When the image processing program is generated and the manufacturing device is also developed as described above, manufacturing of products with the manufacturing device and the image processing program is started (period P2). It is assumed that a peripheral environment of the device is gradually changed such as change of illumination and a recognition rate of the edges 51a and 52a is gradually lowered along with the change of the peripheral environment, for example, in this period P2. Then, the recognition rate is assumed to be lowered to an unallowable level at timing T1. For example, it is assumed that a captured image 50b in which brightness of the components 51 and 52 is lowered due to reduction in light quantity of illumination is captured and positions of the edges 51a and 52a are not able to be correctly detected from this captured image 50b at timing T1.

In this case, through learning in which learning data including the captured image (the captured image 50b, for example), in which the components 51 and 52 are imaged darkly, as an input image and including the positions of the edges 51a and 52a in this captured image as target data is added, the image processing program is regenerated (period P3). Then, product manufacturing using the regenerated image processing program is resumed (period P4).

It is assumed that specifications of a product are subsequently changed and attaching angles of the components 51 and 52 are changed at timing T2, for example. In addition to this, the recognition rate is assumed to be lowered to an unallowable level due to this change. For example, it is assumed that positions of the edges 51a and 52a are not able to be correctly detected from a captured image 50c which is captured after the change of the specifications.

In this case, through learning in which learning data including the captured image (the captured image 50c, for example, in which a product including the components 51 and 52 whose attachment positions are changed is imaged, as an input image and including the positions of the edges 51a and 52a in this captured image as target data is added, the image processing program is regenerated (period P5). Then, product manufacturing using the regenerated image processing program is resumed (period P6).

As the above-described example of FIG. 3, it is possible to determine image processing precision based on a final result of image processing using an image processing program and determine whether or not the image processing program has to be regenerated. However, an image processing program is regenerated at the time when a trouble has actually occurred in output in image processing in this method, and thus, this method has a problem in that use of the image processing program has to be suspended until a new image processing program is generated.

FIG. 4 is a graph illustrating transition of a recognition rate. A graph 61 in FIG. 4 illustrates an example of transition of a recognition rate in the case where degradation of image processing precision is determined based on a recognition rate which is an index based on a final result of image processing and regeneration of an image processing program is performed as described in FIG. 3. Here, a period of regeneration of an image processing program is not included in a time axis direction. According to the graph 61, when the recognition rate is lowered to a predetermined threshold value, an image processing program is regenerated and the recognition rate is restored.

On the other hand, the image processing device 100 according to the second embodiment determines timing at which an image processing program has to be regenerated, based on a new index which changes more largely than the index based on a final result of image processing when change of an imaging environment or state change of an imaging object has occurred, as illustrated in a graph 62. It is determined that an image processing program has to be regenerated when such new index largely varies. Accordingly, it is possible to start regeneration of the image processing program before precision of the image processing program largely degrades. As a result, it is possible to update the image processing program without suspending a product manufacturing process using the image processing program.

FIG. 5 is a diagram illustrating calculation of an index for evaluating necessity of program regeneration. The image processing device 100 according to the second embodiment calculates an index for evaluating necessity of regeneration of an image processing program, based on processing results obtained in respective intermediate nodes of the image processing program. The intermediate nodes of the image processing program include many image filters for detecting features in input images so as to obtain a final result of image processing. Processing results of these image filters sensitively vary with respect to change of an imaging environment or state change of an imaging object. Therefore, by using an index based on processing results in intermediate nodes, it is possible to early detect signs of degradation in image processing precision and start regeneration of an image processing program.

FIG. 5 illustrates an image processing program including nodes N11 to N31, as an example. In image processing using this image processing program, when a captured image 61a in which components 62 and 63 are imaged is inputted, respective positions of an edge 62a of the component 62 and an edge 63a of the component 63 are detected, for example. In an output image 61b corresponding to the input of the captured image 61a, a straight line 62b corresponding to the edge 62a and a straight line 63b corresponding to the edge 63a are displayed at predetermined luminance, for example.

Whenever the image processing device 100 executes an image processing program as the one illustrated in FIG. 5, the image processing device 100 calculates the above-described index based on a processing result in each of intermediate nodes (nodes N11 to N30) except for a terminal node (node N31). In the example of FIG. 5, a processing result in each of the nodes N11 to N30 which are intermediate nodes is outputted as an image. A processing result in an intermediate node will be referred to as an "intermediate processing result" and in the case where an image is outputted as an intermediate processing result, the image will be referred to as the "Intermediate image" below. For example, an intermediate image 64 is outputted as an intermediate processing result in node N15, an intermediate image 65 is outputted as an intermediate processing result in node N26, and an intermediate image 66 is outputted as an intermediate processing result in node N29.

The image processing device 100 calculates an index for evaluating necessity of regeneration of an image processing program, based on intermediate processing results in respective intermediate nodes. This index is referred to below as a "feature amount". Specifically, the image processing device 100 calculates "node feature amounts" for respective intermediate processing results based on the intermediate processing results. Then, the feature amount is represented as a set of the node feature amounts. When the number of pieces of intermediate nodes in an image processing program is assumed to be m, a feature amount F may be represented as $(MF_1, MF_2, \ldots, MF_m)$.

In the case where an intermediate image is outputted in each intermediate node, a node feature amount may be calculated as average luminance in the intermediate image, for example. Further, node feature amounts may be calculated by different methods based on intermediate processing results for respective kinds of partial programs which are incorporated in the intermediate nodes. For example, a node feature amount may be calculated from an intermediate image by the following calculation method illustrated in FIG. 6.

FIG. 6 is a diagram illustrating an example of a calculation method of a node feature amount corresponding to a kind of a partial program.

In the case where a partial program is a Smooth (smoothing) filter or an Inverse (gradation inversion) filter, a node feature amount is calculated as average luminance in an intermediate image.

In the case where a partial program is a Sobel (primary differential) filter or a Laplace (secondary differential) filter, a node feature amount is calculated as the maximum value or the minimum value or both of these of luminance in an intermediate image.

In the case where a partial program is a Sub (difference) filter, a node feature amount is calculated as the number or a rate of pixels whose pixel value is positive, the number or a rate of pixels whose difference value is negative, or both of these among pixels of an intermediate image.

In the case where a partial program is an Add (adding) filter, a node feature amount is calculated as the number or a rate of pixels whose pixel value is equal to or larger than a predetermined value which is larger than 0 (255, for example) among pixels of an intermediate image.

In the case where a partial program is a Diff (an absolute value of a difference) filter, a node feature amount is calculated as the number or a rate of pixels whose pixel value is 0 among pixels of an intermediate image.

In the case where a partial program is any of a Threshold (threshold value processing) filter, an And (logical product) filter, and an Or (logical sum) filter, a node feature amount is calculated as the number or a rate of pixels which have one pixel value (white pixels, for example) among pixels of an intermediate image which is a binary image.

In the case where a partial program is an Erode (contraction) filter, a node feature amount is calculated as a reduction amount of pixels which have one pixel value (white pixels, for example) among pixels of an intermediate image which is a binary image.

In the case where a partial program is a Dilate (expansion) filter, a node feature amount is calculated as an increase amount of pixels which have one pixel value (white pixels, for example) among pixels of an intermediate image which is a binary image.

By calculating node feature amounts by different methods for respective partial programs incorporated in intermediate nodes as these examples, it is possible to more accurately grasp change of an imaging environment or state change of an imaging object. As a result, it is possible to improve accuracy in determination of regeneration timing of an image processing program.

Figure 7:
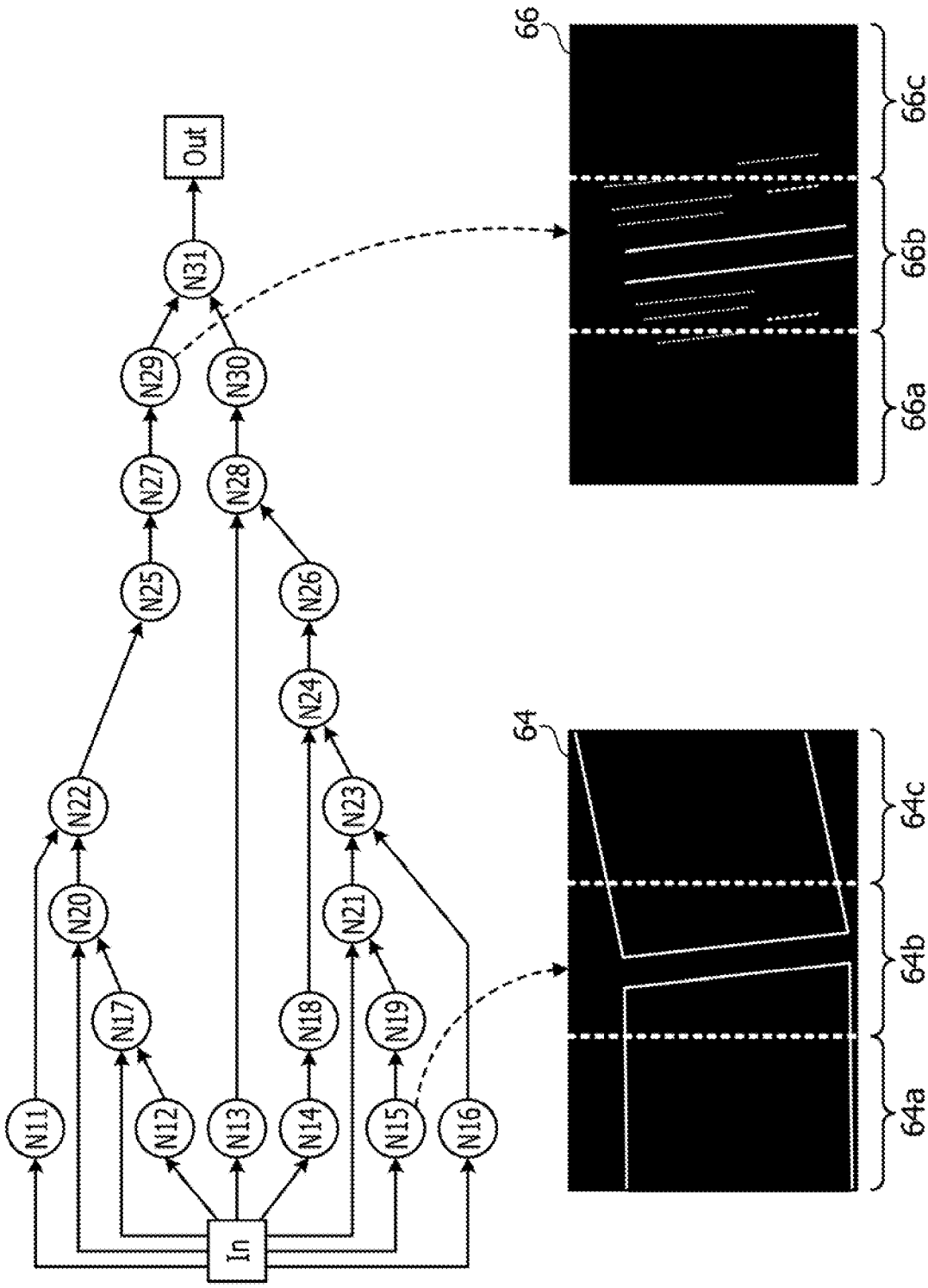
FIG. 7 is a diagram illustrating processing in the case where divided regions are set in an intermediate image.

FIG. 7 is a diagram illustrating processing in the case where divided regions are set in an intermediate image. As illustrated in FIG. 7, an intermediate image may be divided into a plurality of divided regions and a node feature amount may be calculated for each of the divided regions. In the example of FIG. 7, an intermediate image is equally divided into three in a horizontal direction. Then, node feature amounts are respectively calculated for divided regions 64a, 64b, and 64c in an intermediate image 64 and for divided regions 66a, 66b, and 66c in an intermediate image 66. Alternatively, a node feature amount may be calculated based on any one of divided regions in an intermediate image.

Figure 8:
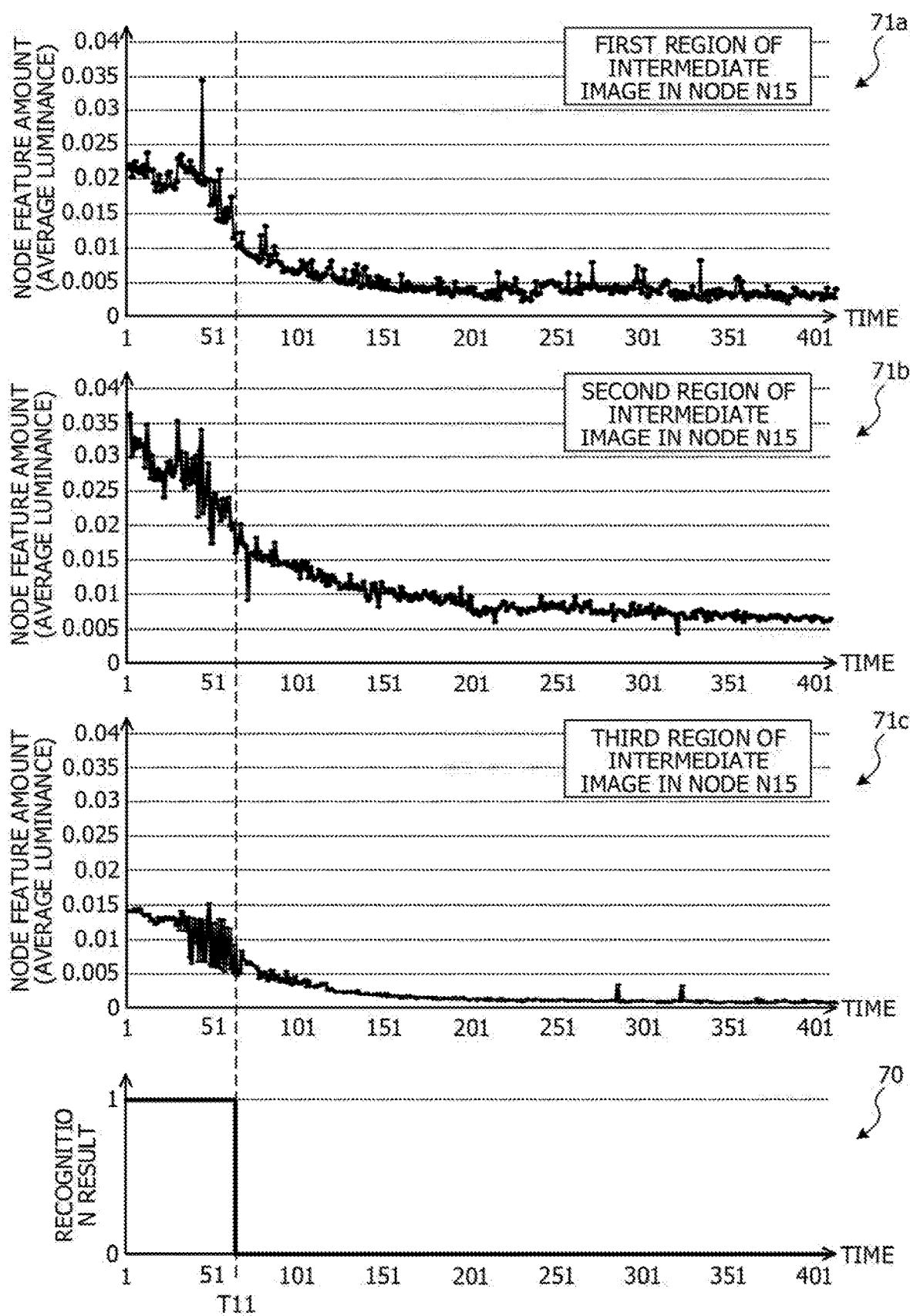
FIG. 8 is a diagram illustrating a first example of variation of a node feature amount corresponding to elapse of time.

FIG. 8 is a diagram illustrating a first example of variation of a node feature amount corresponding to elapse of time. Further, FIG. 9 is a diagram illustrating a second example of variation of a node feature amount corresponding to elapse of time.

FIG. 8 illustrates variation of node feature amounts that are calculated based on an intermediate image outputted from node N15 illustrated in FIG. 7. It is assumed that a node feature amount is calculated for each of divided regions obtained by equally dividing the intermediate image by three in a horizontal direction. Graph 71a illustrates variation of a node feature amount based on the left divided region (first region) in the intermediate image. Graph 71b illustrates variation of a node feature amount based on the middle divided region (second region) in the intermediate image. Graph 71c illustrates variation of a node feature amount based on the right divided region (third region) in the intermediate image.

Figure 9:
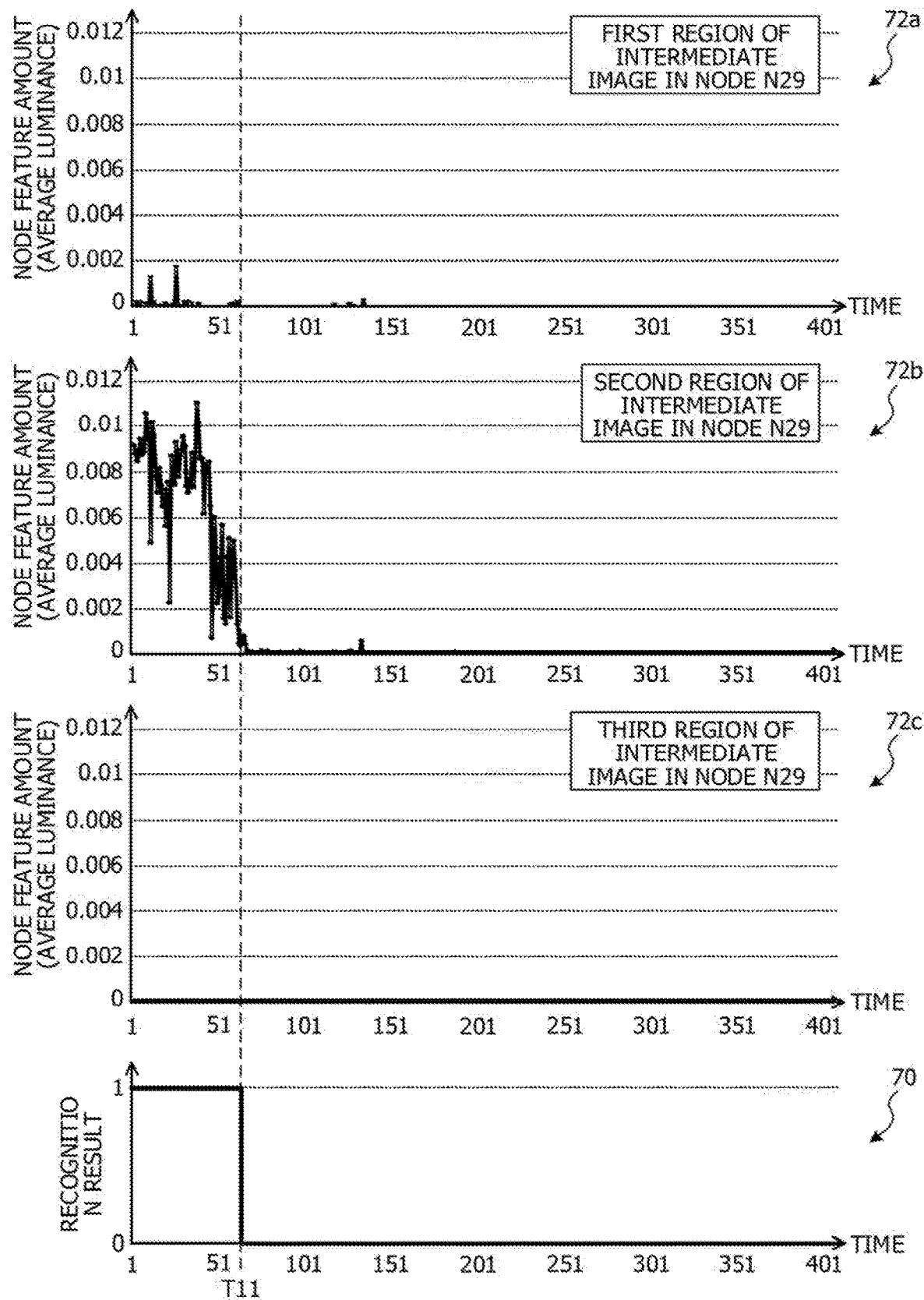
FIG. 9 is a diagram illustrating a second example of variation of a node feature amount corresponding to elapse of time.

Further, FIG. 9 illustrates variation of node feature amounts that are calculated based on an intermediate image outputted from node N29 illustrated in FIG. 7. Graph 72a illustrates variation of a node feature amount based on the left divided region (first region) in the intermediate image. Graph 72b illustrates variation of a node feature amount based on the middle divided region (second region) in the intermediate image. Graph 72c illustrates variation of a node feature amount based on the right divided region (third region) in the intermediate image.

Here, in both of FIG. 8 and FIG. 9, the node feature amount is calculated as average luminance.

Further, graph 70 illustrated in FIG. 8 and FIG. 9 illustrates transition of a recognition result representing whether a specific region is correctly recognized from a captured image that is inputted through execution of an image processing program. Recognition result "1" represents success of correct recognition and recognition result "0" represents failure of correct recognition. According to graph 70, correct recognition of the specific region has succeeded until timing T11, but correct recognition of the specific region has failed from timing T11.

Comparing graphs 71a to 71c with graph 70, it is found that the node feature amount starts lowering from an earlier stage than timing T11, especially in graph 71b. Further, comparing graphs 72a to 72c with graph 70, it is found that the node feature amount starts lowering from an earlier stage than timing T11, especially in graph 72b. Accordingly, by using a lowering amount of a node feature amount corresponding to a time result as an index, it is possible to determine that an image processing program has to be regenerated at timing before image processing precision actually degrades largely.

Further, according to FIG. 8 and FIG. 9, it is found that timing at which an image processing program has to be regenerated is able to be accurately detected by using the node feature amount not based on the first region and the third region but based on the second region. It is conceivable that this is because the specific region being a recognition object is imaged in the second region. Therefore, the image processing device 100 may calculate node feature amounts corresponding to respective intermediate nodes only based on information of the second regions of the intermediate images. Accordingly, it is possible to shorten calculation processing time of a node feature amount without lowering determination accuracy of necessity of regeneration and as a result, it is possible to shorten time elapsing until determination of whether an image processing program has to be regenerated.

A divided region which is used for calculation of a node feature amount may be specified among divided regions set in an intermediate image, based on a level of possibility at which a specific region being a recognition object is imaged in the region. This specification may be performed through an operation by an administrator administrating a product manufacturing device, for example.

The image processing device 100 will now be described in detail.

Figure 10:
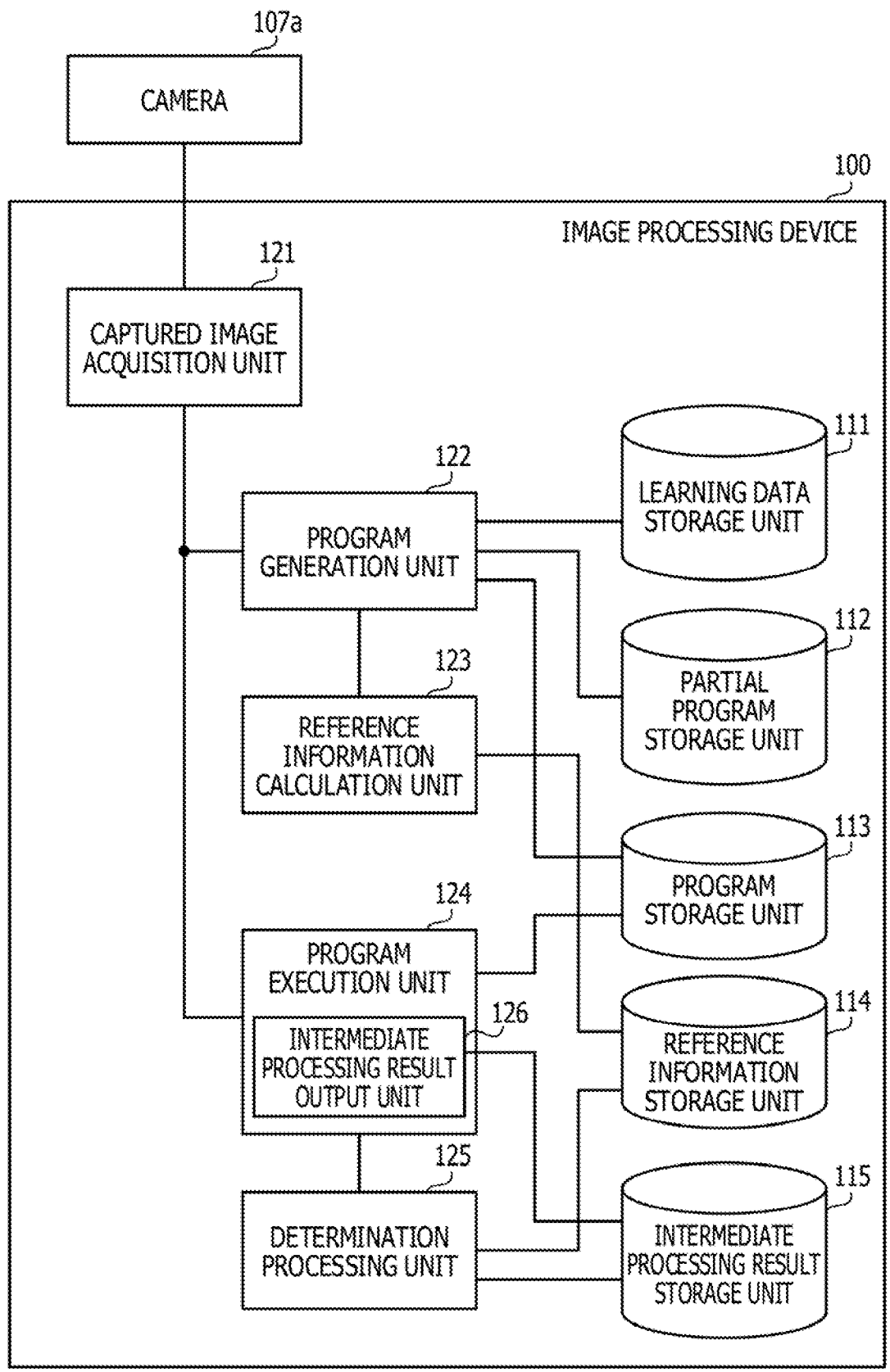
FIG. 10 is a block diagram illustrating a configuration example of processing functions provided to the image processing device.

FIG. 10 is a block diagram illustrating a configuration example of processing functions provided to the image processing device. The image processing device 100 includes a learning data storage unit 111, a partial program storage unit 112, a program storage unit 113, a reference information storage unit 114, an intermediate processing result storage unit 115, a captured image acquisition unit 121, a program generation unit 122, a reference information calculation unit 123, a program execution unit 124, and a determination processing unit 125.

The learning data storage unit 111, the partial program storage unit 112, the program storage unit 113, the reference information storage unit 114, and the intermediate processing result storage unit 115 are realized as storage regions of the storage devices included in the image processing device 100 such as the RAM 102 and the HDD 103, for example. Respective processing of the captured image acquisition unit 121, the program generation unit 122, the reference information calculation unit 123, the program execution unit 124, and the determination processing unit 125 are realized by executing a predetermined program by the processor 101 included in the image processing device 100, for example.

In the learning data storage unit 111, learning data that is used in generation of an image processing program is stored. In each learning data, an input image and target data or a target image which is a target in execution of image processing with respect to the input image are included.

The partial program storage unit 112 stores a plurality of kinds of partial programs which may be incorporated in respective nodes of an image processing program having the tree structure.

The program storage unit 113 stores an image processing program that is generated by genetic programming. Practically, it is enough for the program storage unit 113 to store a connection structure of nodes of a generated image processing program and identification information of partial programs incorporated in respective nodes.

The reference information storage unit 114 stores various types of reference information that are used for determining whether an image processing program has to be regenerated when the generated image processing program is executed.

The intermediate processing result storage unit 115 stores intermediate processing results that are outputted in processing in respective intermediate nodes when a generated image processing program is executed.

The captured image acquisition unit 121 acquires a captured image captured by the camera 107a. A captured image that is acquired is used as an input image to be included in learning data, for example. Further, in execution of a generated image processing program by the program execution unit 124, the captured image acquisition unit 121 acquires a captured image from the camera 107a and outputs the captured image to the program execution unit 124.

The program generation unit 122 generates an image processing program by genetic programming based on learning data stored in the learning data storage unit 111. In this generation, the program generation unit 122 acquires partial programs which are to be incorporated in respective nodes from the partial program storage unit 112. The program generation unit 122 stores information on the generated image processing program in the program storage unit 113.

The reference information calculation unit 123 executes a generated image processing program by using each learning data used in generation of an image processing program and calculates reference information based on intermediate processing results in respective intermediate nodes so as to store the reference information in the reference information storage unit 114. The reference information is used for determining whether an image processing program has to be regenerated when the generated image processing program is executed by the program execution unit 124. There are an initial feature amount and a threshold value as reference information.

The program execution unit 124 constructs a generated image processing program based on information of the program storage unit 113 and executes the constructed image processing program by using a captured image acquired by the captured image acquisition unit 121 as an input. Further, the program execution unit 124 includes an intermediate processing result output unit 126. The intermediate processing result output unit 126 stores intermediate processing results, which are outputted from respective intermediate nodes in execution of an image processing program, in the intermediate processing result storage unit 115.

The determination processing unit 125 calculates a feature amount based on intermediate processing results stored in the intermediate processing result storage unit 115. The determination processing unit 125 determines whether an image processing program has to be regenerated, based on a calculated feature amount and reference information stored in the reference information storage unit 114.

Processing of the image processing device 100 will now be described by using a flowchart.

Figure 11:
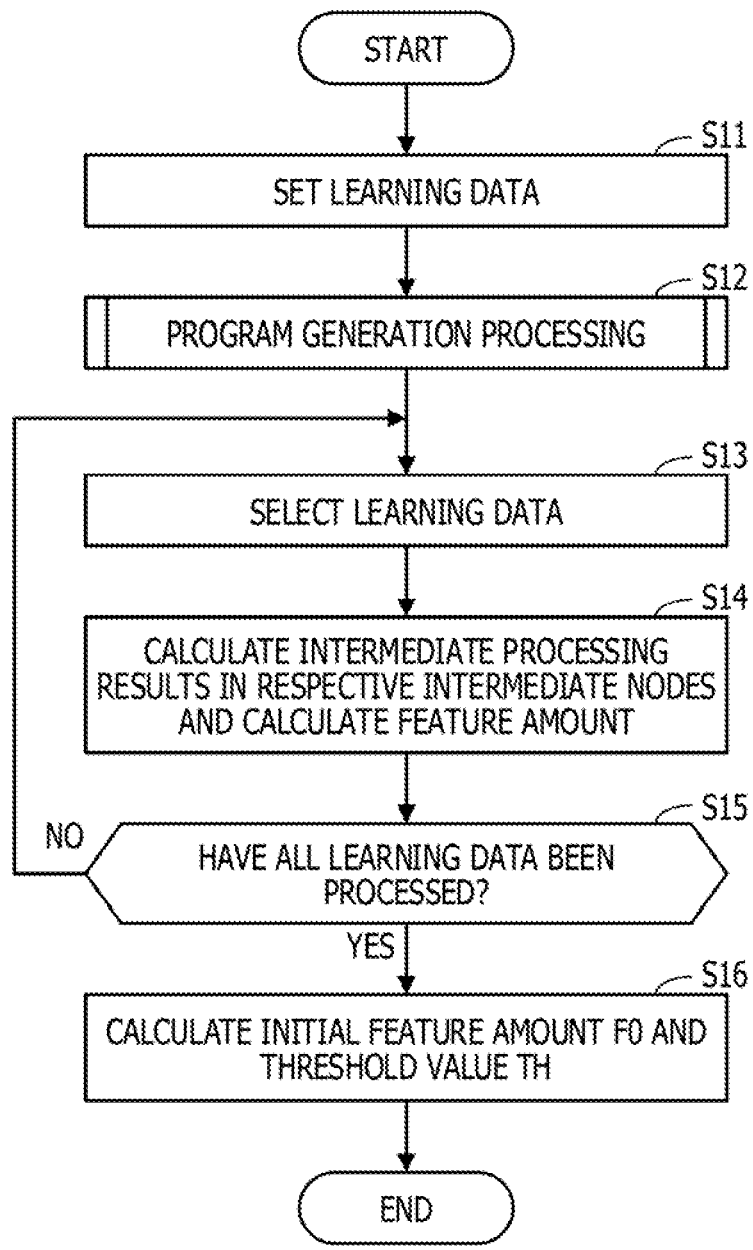
FIG. 11 is a flowchart illustrating an example of a procedure of generation processing of an image processing program and reference information.

First, FIG. 11 is a flowchart illustrating an example of a procedure of generation processing of an image processing program and reference information.

[Step S11] The program generation unit 122 sets learning data which is to be used in generation of an image processing program. For example, in the first generation of an image processing program, the program generation unit 122 stores a captured image, which is acquired by the captured image acquisition unit 121, in the learning data storage unit 111 as an input image of the learning data, in response to an operation by a user. Further, the program generation unit 122 generates a target image or target data corresponding to the input image in response to an operation by a user and stores the target image or the target data in the learning data storage unit 111 while associating the target image or the target data with the input image. Accordingly, one or more set/sets of learning data is/are stored in the learning data storage unit 111.

Further, in regeneration of the image processing program, the program generation unit 122 stores at least part of captured images, which have been used as input images in program execution in the program execution unit 124 from the previous regeneration to the present, in the learning data storage unit 111 as input images of the learning data. Furthermore, the program generation unit 122 generates target images or target data corresponding to these input images in response to an operation by a user and stores the target images or the target data in the learning data storage unit 111 while associating the target images or the target data with the input images respectively. Thus, new leaning data are added to the learning data storage unit 111.

[Step S12] The program generation unit 122 generates an image processing program by genetic programming based on the learning data stored in the learning data storage unit 111. The program generation unit 122 stores information on the generated image processing program in the program storage unit 113.

[Step S13] The reference information calculation unit 123 selects one piece of learning data among the learning data used in the program generation processing in step S12.

[Step S14] The reference information calculation unit 123 executes the generated image processing program by using an input image of the selected learning data as an input and calculates intermediate processing results in respective intermediate nodes of the image processing program. The reference information calculation unit 123 calculates a feature amount based on respective calculated intermediate processing results. As described above, the feature amount is represented as a set of the node feature amounts calculated based on the intermediate processing results in respective intermediate nodes.

[Step S15] The reference information calculation unit 123 determines whether all pieces of the learning data used in the program generation processing have been processed. In the case where there are unprocessed learning data, the processing is returned to step S13 and one piece of unprocessed learning data is selected. On the other hand, in the case where all pieces of the learning data have been processed, processing of step S16 is executed.

[Step S16] The reference information calculation unit 123 calculates an initial feature amount F0 and a threshold value TH as reference information by using feature amounts calculated based on respective pieces of learning data and stores the initial feature amount F0 and the threshold value TH In the reference information storage unit 114.

When it is assumed that n sets of learning data are used in the program generation processing in step S12, n sets of feature amounts have been calculated at the time when step S16 is executed. The reference information calculation unit 123 calculates an average of these n sets of feature amounts as the initial feature amount F0. Specifically, the reference information calculation unit 123 calculates an average value of node feature amounts of respective intermediate nodes included in n sets of feature amounts. When it is assumed that the number of nodes of the image processing program is m, the initial feature amount F0 including m pieces of average values of the node feature amounts is calculated through this calculation. Here, in the case where node feature amounts are calculated by different methods for respective kinds of partial programs which are incorporated in intermediate nodes as illustrated in FIG. 6, each of the node feature amounts is normalized and an average value is calculated.

Further, the reference information calculation unit 123 calculates a numeral value representing a variation degree of n sets of feature amounts as the threshold value TH. The reference information calculation unit 123 calculates a distance between each of the n sets of feature amounts and the initial feature amount F0, for example. As the distance, an Euclidean distance or a Mahalanobis distance, for example, is calculated. The reference information calculation unit 123 calculates an average value AVE of n pieces of calculated distances and standard deviation $\sigma$. The reference information calculation unit 123 calculates an addition value of the average value AVE and the standard deviation $\sigma$ as the threshold value TH.

Figure 12:
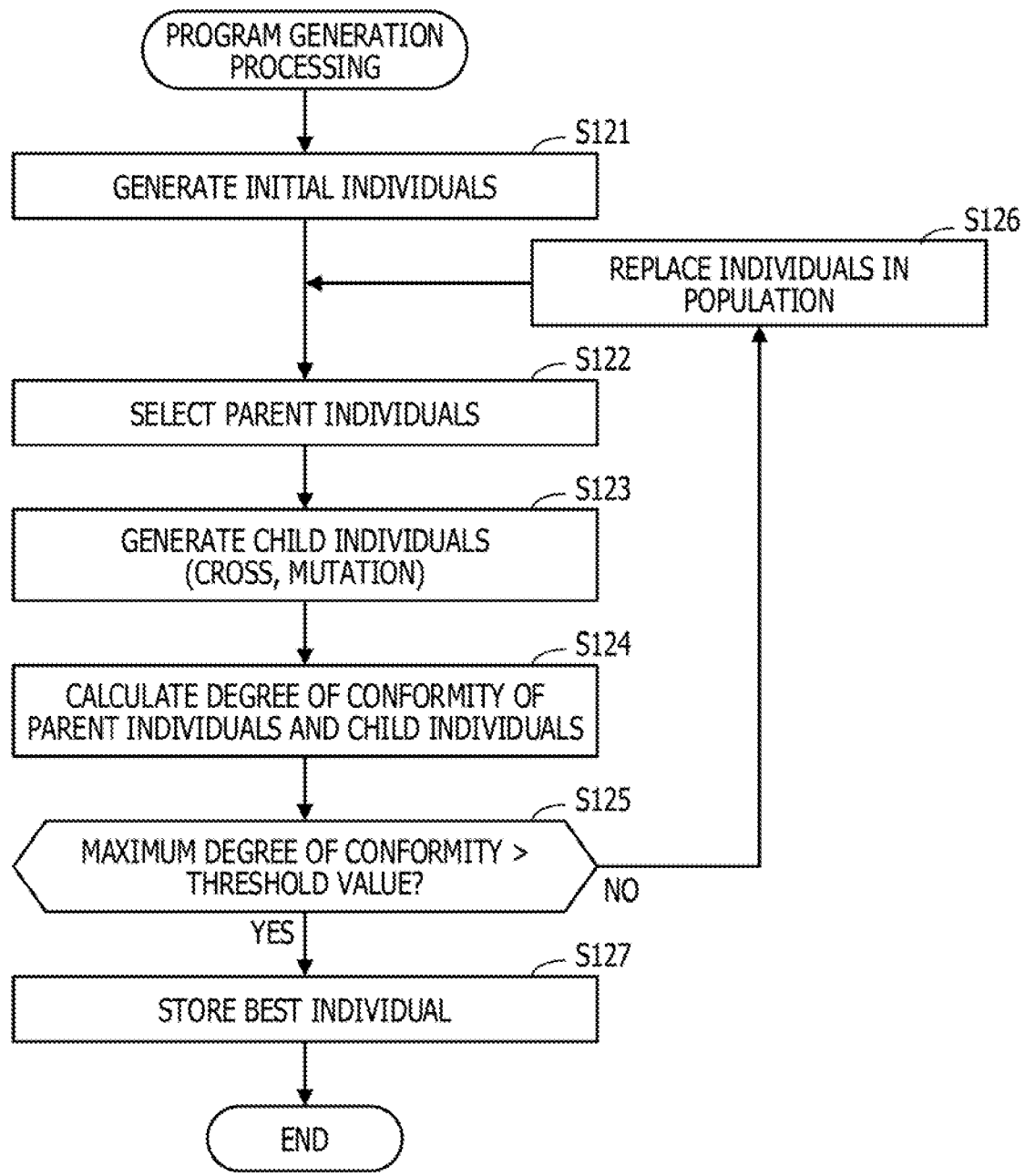
FIG. 12 is a flowchart illustrating an example of a procedure of generation processing of an image processing program.

FIG. 12 is a flowchart illustrating an example of a procedure of generation processing of an image processing program. The processing in FIG. 12 corresponds to step S12 In FIG. 11.

[Step S121] The program generation unit 122 generates a plurality of initial individuals to be included in a population. Partial programs are selected at random from a plurality of kinds of partial programs, which are stored in the partial program storage unit 112, and the selected partial programs are incorporated in nodes of respective initial individuals.

[Step S122] The program generation unit 122 selects a given number of parent individuals at random from the population. Hereinafter, it is assumed that two parent individuals are selected, as an example.

[Step S123] The program generation unit 122 performs processing of an evolution process with respect to the selected two parent individuals so as to generate a given number, which is two or more, of child individuals. In the evolution process, cross processing and mutation processing are performed with respect to the two parent individuals. Different cross processing and mutation processing may be performed with respect to the two parent individuals so as to generate three or more child individuals.

[Step S124] The program generation unit 122 calculates a degree of conformity for each of the parent individuals selected in step S122 and the child individuals generated in step S123. In this processing, image processing using each object individual is executed with respect to each input image included in each learning data and an image after the execution is compared with a corresponding target image or corresponding target data so as to calculate a degree of conformity. In the case where there are a plurality of sets of learning data, an average of degrees of conformity obtained by respectively using the plurality of sets of learning data is calculated for each individual.

Here, degrees of conformity of the initial individuals included in the population may be calculated at the time when the population is generated in step S121. In this case, only degrees of conformity of the generated child individuals are calculated in step S124.

[Step S125] The program generation unit 122 determines whether any of the degrees of conformity of the generated child individuals and the parent individuals which are the bases is higher than a predetermined threshold value. In the case where all the degrees of conformity are equal to or lower than the threshold value, processing of step S126 Is executed. In the case where one or more degrees of conformity are higher than the threshold value, processing of step S127 is executed.

[Step S126] The program generation unit 122 performs survival selection from the parent individuals selected in step S122 and the child individuals generated in step S123. For example, an individual whose calculated degree of conformity reaches the highest is selected as the first survival individual and the second survival individual is further selected depending on the degree of conformity from the rest of the individuals. The program generation unit 122 replaces the two individuals selected as the parent individuals in step S122 among the individuals included in the population with the first survival individual and the second survival individual. Accordingly, a generation of the population is updated.

[Step S127] The program generation unit 122 selects an individual whose degree of conformity reaches the highest as the best individual among the parent individuals selected in step S122 and the child individuals generated in step S123. The selected best individual is an optimized image processing program. The program generation unit 122 stores information representing the selected best individual in the program storage unit 113.

Figure 13:
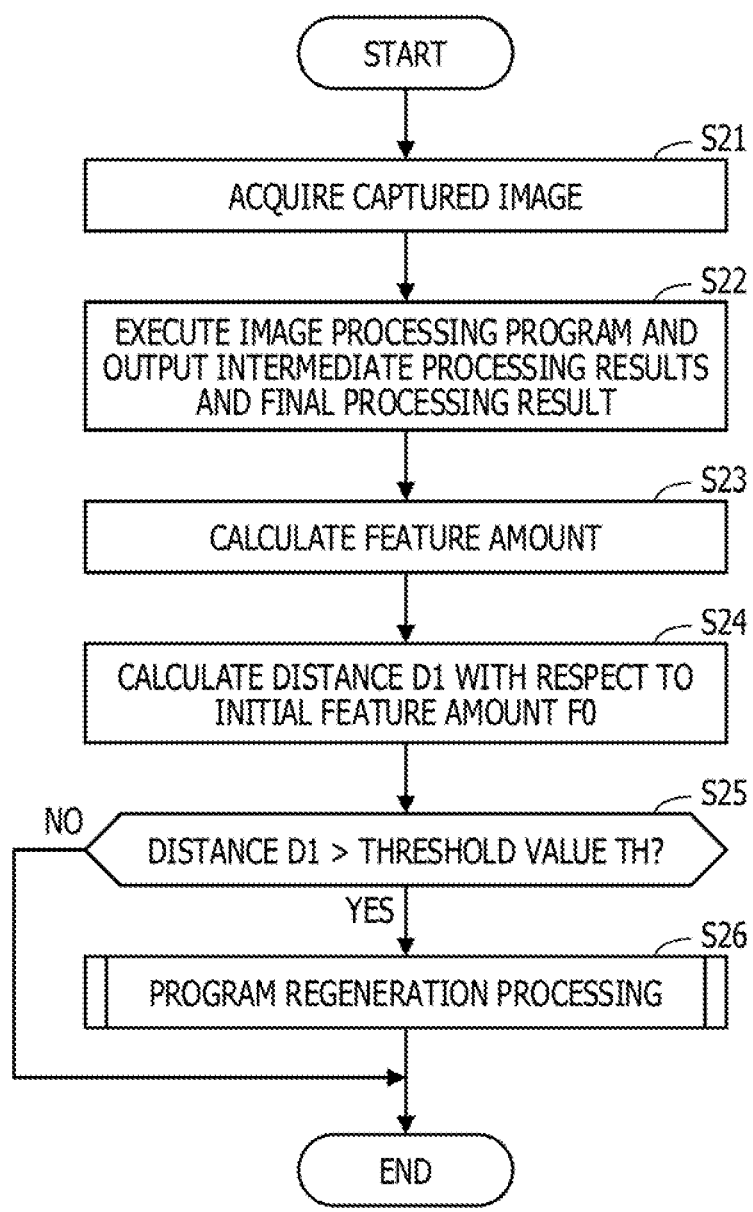
FIG. 13 is a flowchart illustrating an example of a processing procedure in execution of a generated image processing program.

FIG. 13 is a flowchart illustrating an example of a processing procedure in execution of a generated image processing program.

[Step S21] The captured image acquisition unit 121 makes the camera 107a capture an image and acquires the captured image from the camera 107a.

[Step S22] The program execution unit 124 constructs the generated image processing program based on information of the program storage unit 113. The program execution unit 124 executes the constructed image processing program by using the captured image acquired by the captured image acquisition unit 121 as an input and outputs a final processing result. Further, the intermediate processing result output unit 126 stores intermediate processing results, which are outputted from respective intermediate nodes in the execution of the image processing program, in the intermediate processing result storage unit 115.

[Step S23] The determination processing unit 125 calculates a feature amount F based on the intermediate processing results of respective intermediate nodes which are stored in the intermediate processing result storage unit 115. In this calculation, the determination processing unit 125 calculates node feature amounts based on intermediate processing results for respective intermediate nodes. In the case where the number of nodes is m, m pieces of node feature amounts are included in the feature amount F.

[Step S24] The determination processing unit 125 calculates a distance D1 between the calculated feature amount F and the initial feature amount F0 stored in the reference information storage unit 114. The distance D1 is calculated by the same method as that in step S16 in FIG. 11. The distance D1 represents a performance evaluation value of an image processing program.

[Step S25] The determination processing unit 125 compares the calculated distance D1 with the threshold value TH stored in the reference information storage unit 114. In the case where the distance D1 is larger than the threshold value TH, the determination processing unit 125 determines that the image processing program has to be regenerated and executes processing of step S26. On the other hand, in the case where the distance D1 is equal to or smaller than the threshold value TH, the determination processing unit 125 determines that the image processing program does not have to be regenerated and ends the processing.

[Step S26] The determination processing unit 125 displays information representing that the image processing program has to be regenerated on the display device 104a, for example. Then, the image processing program is regenerated by genetic programming. At this time, the determination processing unit 125 stores captured images, which are inputted when the program execution unit 124 has executed the image processing program the last plurality of times, for example, in the learning data storage unit 111 as new input images of learning data. Further, target images or target data corresponding to the new input images are generated and stored in the learning data storage unit 111 in a manner to be associated with the input images, by processing corresponding to an operation by a user. Accordingly, new learning data are added to the learning data storage unit 111. Then, the processing illustrated in FIG. 11 is executed. In step S11 In FIG. 11, the program generation unit 122 sets existing learning data and the added learning data as learning data to be used for program generation.

Figure 14:
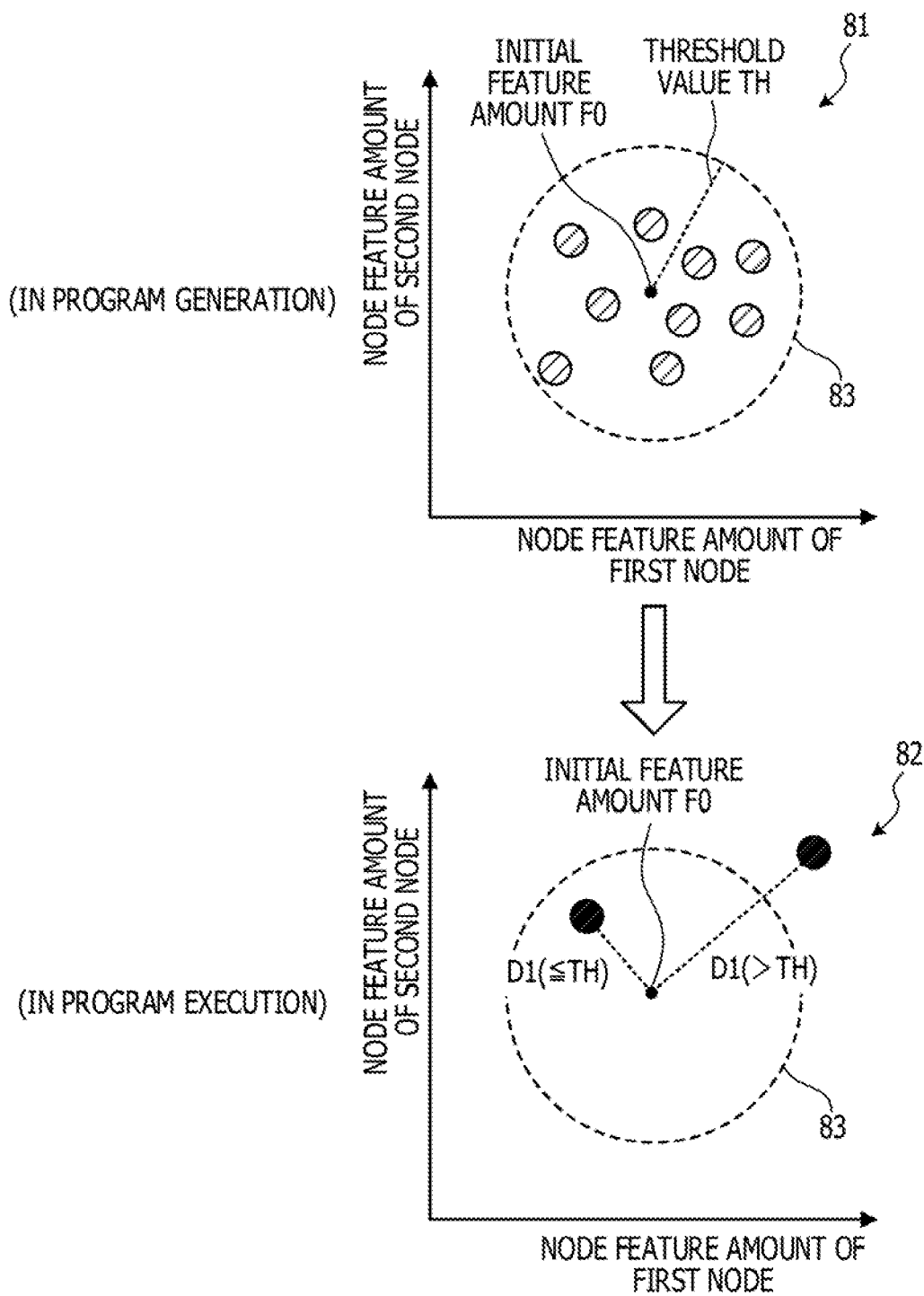
FIG. 14 is a diagram illustrating a calculation example of a feature amount.

FIG. 14 is a diagram illustrating a calculation example of a feature amount. In this FIG. 14, it is assumed that only two intermediate nodes which are the first node and the second node are included in an image processing program for the sake of simplicity of the description.

Graph 81 in FIG. 14 illustrates distribution of feature amounts obtained when an image processing program is generated by the program generation unit 122. Circles in graph 81 denote positions of feature amounts, which are calculated when an image processing program is executed by using individual input images as inputs, in a coordinate space of node feature amounts of the first node and node feature amounts of the second node. In step S16 in FIG. 11, the initial feature amount F0 and the threshold value TH are calculated based on these feature amounts. As illustrated in graph 81, the initial feature amount F0 and the threshold value TH are calculated so that the above-mentioned feature amounts are included in circle 83 whose radius is the threshold value TH centered on the initial feature amount F0.

Meanwhile, graph 82 in FIG. 14 illustrates distribution of feature amounts obtained when a generated image processing program is executed by the program execution unit 124. Circles in graph 82 denote positions of feature amounts, which are calculated when an image processing program is executed by using individual captured images as inputs, in a coordinate space of node feature amounts of the first node and node feature amounts of the second node.

The determination processing in step S25 in FIG. 13 is equivalent to determination of whether or not positions of calculated feature amounts on the coordinate space is included in circle 83.

In the case where the positions of the feature amounts are included in circle 83, it is determined that change of an imaging environment or state change of an imaging object is not large because the variation amount of the feature amount from the time of program generation is within a given range. In this case, it is determined that the image processing program does not have to be regenerated. On the other hand, in the case where the positions of the feature amounts are out of circle 83, it is determined that change of an imaging environment or state change of an imaging object has become unacceptably large because the variation amount of the feature amount from the time of program generation deviates from the given range. In this case, it is determined that the image processing program has to be regenerated.

Thus, according to the image processing device 100 of the second embodiment, whenever executing a generated image processing program, the image processing device 100 is capable of accurately grasping signs of performance degradation of the image processing program and determining that the image processing program has to be regenerated before image processing precision largely degrades. As a result, it is possible to regenerate the image processing program by relearning without suspending an operation using the image processing program.

Third Embodiment

An image processing device according to a third embodiment will now be described. The image processing device according to the third embodiment is obtained such that a part of the processing of the image processing device 100 according to the second embodiment is modified.

Figure 15:
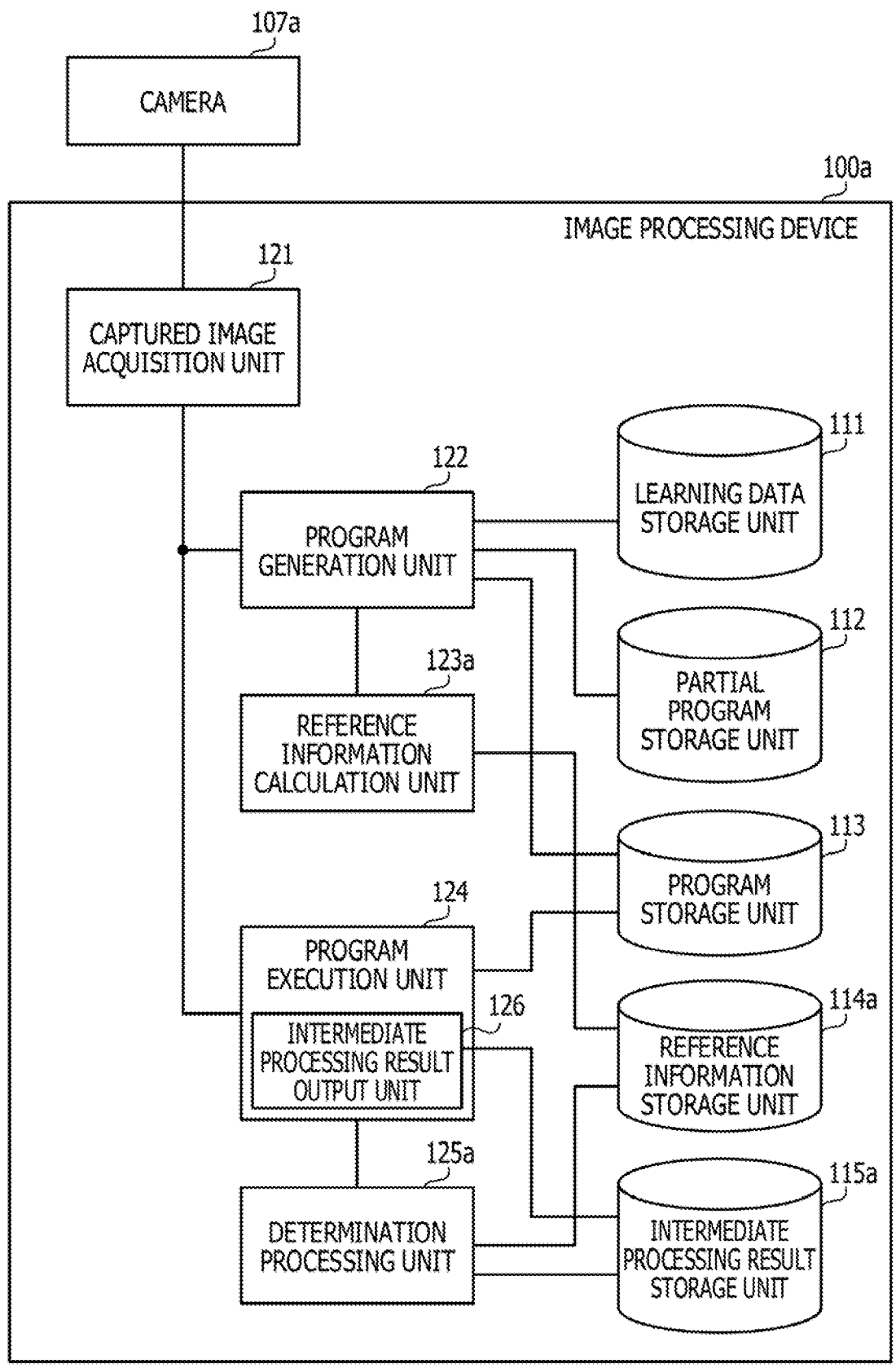
FIG. 15 is a block diagram illustrating a configuration example of processing functions provided to an image processing device according to a third embodiment.

FIG. 15 is a block diagram illustrating a configuration example of processing functions provided to the image processing device according to the third embodiment. Components common to those in FIG. 10 are denoted with the same reference characters in FIG. 15. The image processing device 100a according to the third embodiment includes a reference information storage unit 114a, an intermediate processing result storage unit 115a, a reference information calculation unit 123a, and a determination processing unit 125a instead of the reference information storage unit 114, the intermediate processing result storage unit 115, the reference information calculation unit 123, and the determination processing unit 125 of FIG. 10.

The reference information calculation unit 123a is different from the reference information calculation unit 123 of FIG. 10 in that the reference information calculation unit 123a calculates only the threshold value TH as reference information. The reference information storage unit 114a is different from the reference information storage unit 114 of FIG. 10 in that the reference information storage unit 114a stores only the threshold value TH as reference information. The determination processing unit 125a is different from the determination processing unit 125 of FIG. 10 in that the determination processing unit 125a stores a feature amount, which is calculated when the program execution unit 124 executes an image processing program, in the intermediate processing result storage unit 115a and calculates an index D2 Instead of the distance D1. The intermediate processing result storage unit 115a is different from the intermediate processing result storage unit 115 of FIG. 10 in that the intermediate processing result storage unit 115a further holds feature amounts, which are calculated by the determination processing unit 125a when the program execution unit 124 has executed an image processing program the last p times (here, p is an integer which is 2 or larger). That is, the intermediate processing result storage unit 115a holds p sets of feature amounts in addition to intermediate processing results.

Figure 16:
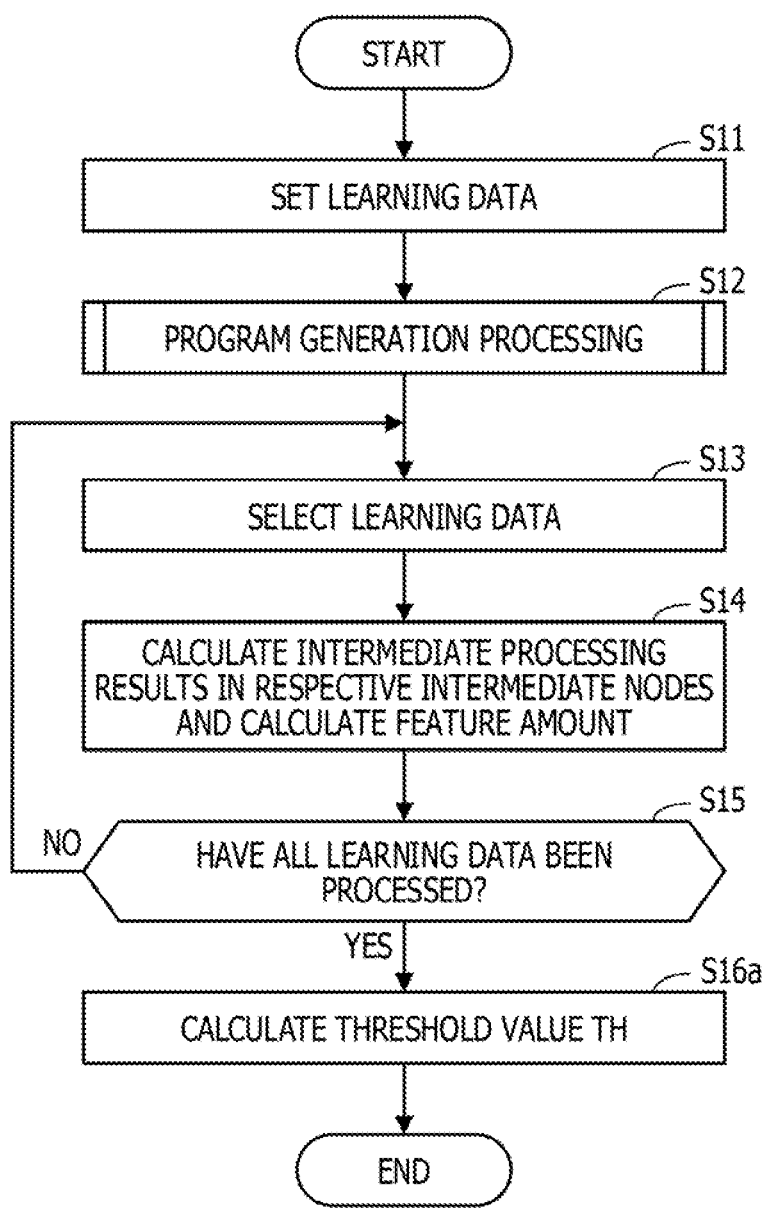
FIG. 16 is a flowchart illustrating an example of a procedure of generation processing of an image processing program and reference information according to the third embodiment.

FIG. 16 is a flowchart illustrating an example of a procedure of generation processing of an image processing program and reference information according to the third embodiment. In this processing of FIG. 16, step S16 in the processing in FIG. 11 is replaced with step S16a. Here, the processing of steps S13 to S15 are executed by the reference information calculation unit 123a instead of the reference information calculation unit 123, but the processing contents are the same.

[Step S16a] The reference information calculation unit 123a calculates a threshold value TH as reference information by using feature amounts calculated based on respective learning data and stores the threshold value TH in the reference information storage unit 114a. The calculation method of the threshold value TH is the same as that in step S16 in FIG. 11.

Figure 17:
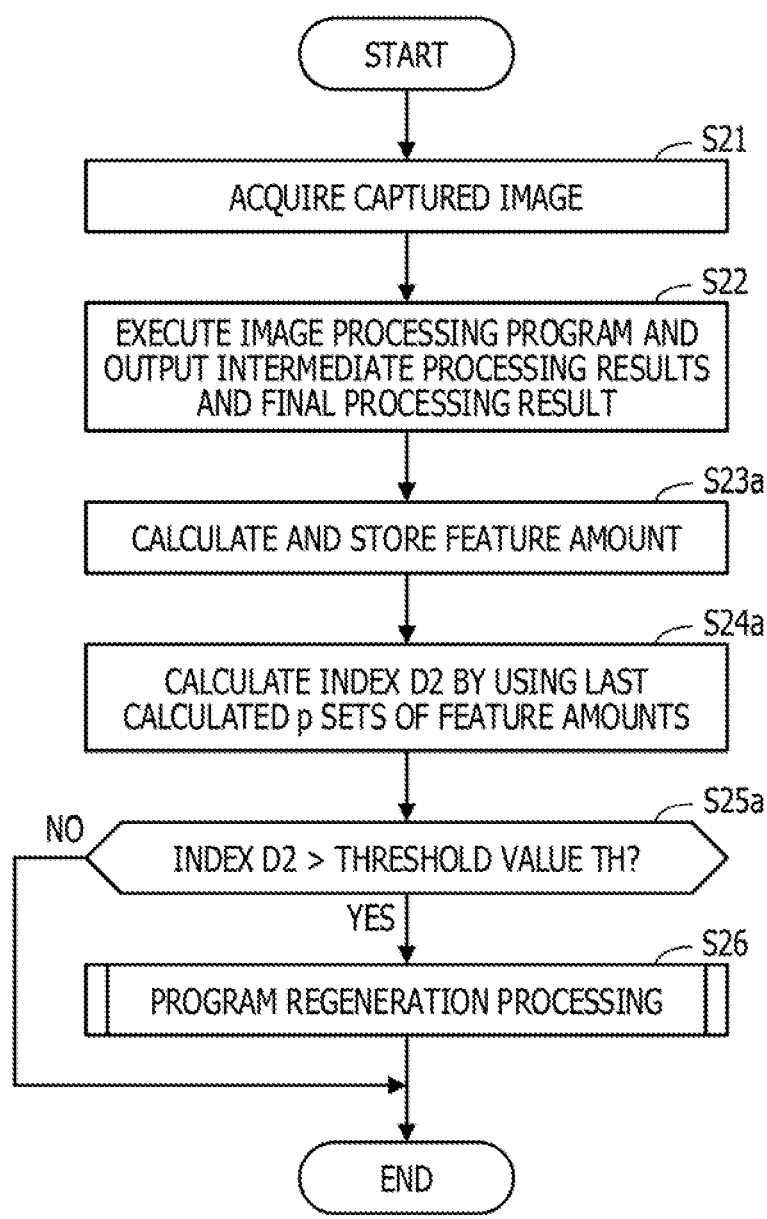
FIG. 17 is a flowchart illustrating an example of a processing procedure in execution of the image processing program according to the third embodiment.

FIG. 17 is a flowchart illustrating an example of a processing procedure in execution of the image processing program according to the third embodiment. In this processing of FIG. 17, steps S23 to S25 in the processing in FIG. 13 are replaced with steps S23a to S25a. Here, in step S22, Intermediate processing results are stored in the intermediate processing result storage unit 115a.

[Step S23a] The determination processing unit 125a calculates a feature amount F based on the intermediate processing results of respective intermediate nodes which are stored in the intermediate processing result storage unit 115a, in the same procedure as that in step S23 In FIG. 13. In the case where the number of intermediate nodes is m, m pieces of node feature amounts are included in the feature amount F. The determination processing unit 125a stores the calculated feature amount F in the intermediate processing result storage unit 115a. At this time, the determination processing unit 125a performs control so that only last p sets of calculated feature amounts F are held in the intermediate processing result storage unit 115a.

[Step S24a] The determination processing unit 125a reads the p sets of feature amounts F from the intermediate processing result storage unit 115a. The determination processing unit 125a calculates an index D2 representing a variation degree of the p sets of feature amounts F. This index D2 represents a performance evaluation value of an image processing program.

The index D2 is calculated by the same calculation method as that for the threshold value TH, for example. That is, the determination processing unit 125a first calculates an average feature amount which is an average of the p sets of feature amounts F. Specifically, the determination processing unit 125a calculates an average value of node feature amounts of respective intermediate nodes included in the p sets of feature amounts. When it is assumed that the number of nodes of the image processing program is m, an average feature amount including m pieces of average values of the node feature amounts is calculated through this calculation. Here, in the case where node feature amounts are calculated by different methods for respective kinds of partial programs which are incorporated in intermediate nodes as illustrated in FIG. 6, each of the node feature amounts is normalized and an average value is calculated. Then, the reference information calculation unit 123a calculates a distance between each of the p sets of feature amounts and the average feature amount. The reference information calculation unit 123a calculates an average value of the calculated n pieces of distances and a standard deviation. The reference information calculation unit 123a calculates an addition value of the average value and the standard deviation as the index D2.

[Step S25a] The determination processing unit 125a compares the calculated index D2 with the threshold value TH stored in the reference information storage unit 114. In the case where the index D2 is larger than the threshold value TH, the determination processing unit 125a determines that the image processing program has to be regenerated and executes the processing of step S26. On the other hand, in the case where the index D2 is equal to or smaller than the threshold value TH, the determination processing unit 125a determines that the image processing program does not have to be regenerated and ends the processing.

According to the image processing device 100a described above, magnitude of change of an imaging environment or state change of an imaging object is detected based on a variation amount of the feature amounts F respectively calculated in the last predetermined times of execution of the image processing program. Accordingly, it is possible to accurately grasp signs of performance degradation of the image processing program and determine that the image processing program has to be regenerated before image processing precision largely degrades.

Here, the image processing device 100a described above calculates the index D2 by using the feature amounts F respectively calculated in the last predetermined times of execution of the image processing program. However, the image processing device 100a may calculate the index D2 by using the feature amounts F respectively calculated in execution of the image processing program within the last given period of time, as another example. In this case, the number of the feature amounts F used for calculation of the index D2 is variable.

Fourth Embodiment

The program generation function and the program execution function provided to the image processing device 100 according to the second embodiment or the image processing device 100a according to the third embodiment may be respectively provided to separate devices. Such system will be illustrated below as a fourth embodiment.

Figure 18:
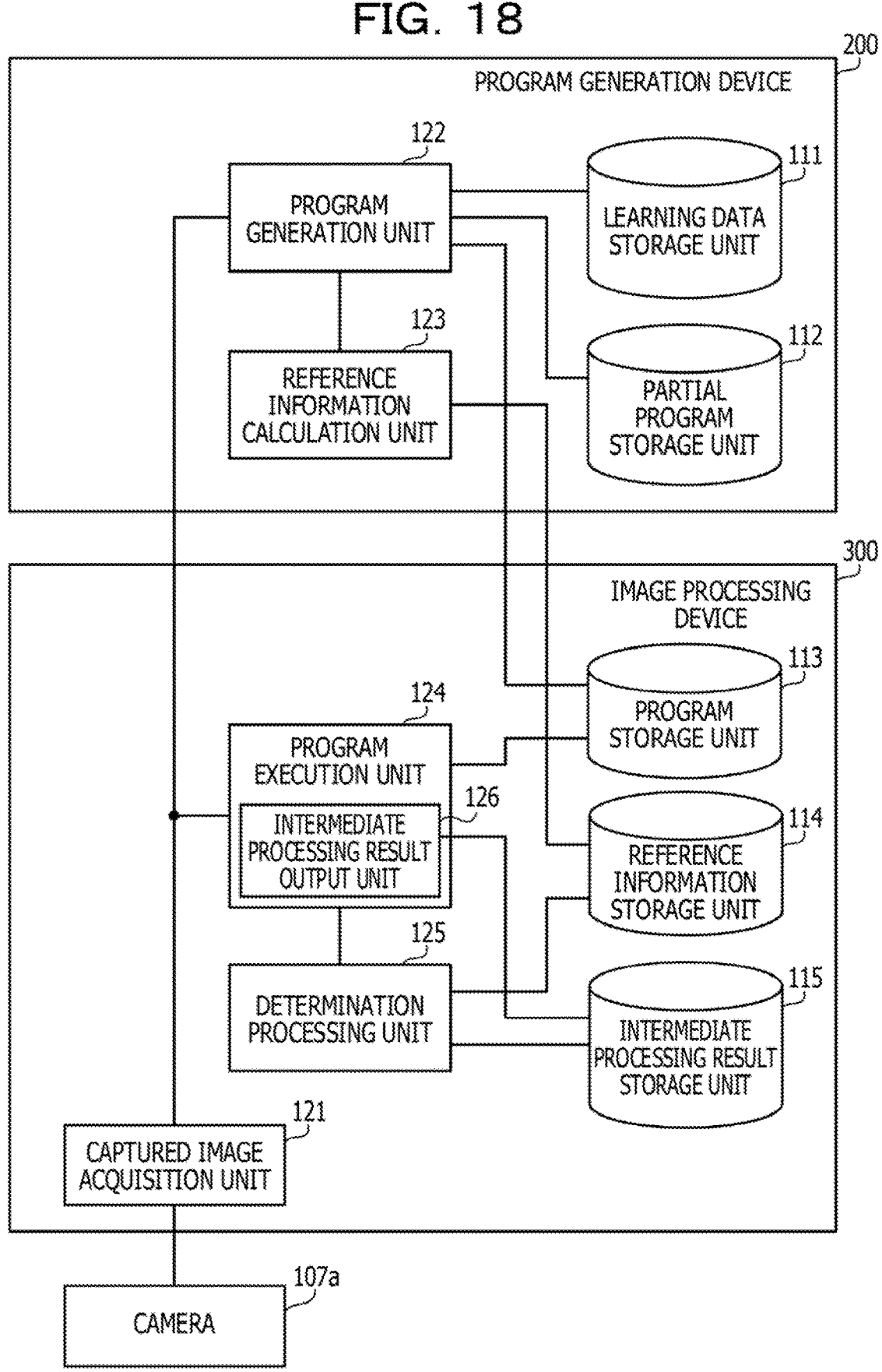
FIG. 18 is a block diagram illustrating configuration examples of processing functions of a program generation device and an image processing device according to a fourth embodiment.

FIG. 18 is a block diagram illustrating configuration examples of processing functions of a program generation device and an image processing device according to the fourth embodiment. In this FIG. 18, it is assumed that the program generation function and the program execution function provided to the image processing device 100 according to the second embodiment are respectively provided to a program generation device 200 and an image processing device 300. Here, components same as those in FIG. 10 are denoted with the same reference characters in FIG. 18. Further, the program generation device 200 and the image processing device 300 are feasible as a computer having the hardware configuration illustrated in FIG. 2, for example.

The program generation device 200 includes the learning data storage unit 111, the partial program storage unit 112, the program generation unit 122, and the reference information calculation unit 123. However, in the case where a captured image to be registered as an input image in learning data is acquired from a camera, the program generation unit 122 acquires the captured image via the captured image acquisition unit 121 of the image processing device 300, for example. Further, the program generation unit 122 transmits a generated image processing program to the image processing device 300 and stores the image processing program in the program storage unit 113 of the image processing device 300. Further, the reference information calculation unit 123 transmits calculated reference information to the image processing device 300 and stores the reference information in the reference information storage unit 114 of the image processing device 300.

The image processing device 300 includes the program storage unit 113, the reference information storage unit 114, the intermediate processing result storage unit 115, the captured image acquisition unit 121, the program execution unit 124, and the determination processing unit 125. Here, the camera 107a is connected to the image processing device 300 and the captured image acquisition unit 121 acquires captured images from the camera 107a.

With such configuration, the program generation device 200 generates an image processing program by genetic programming and calculates reference information. Further, the image processing device 300 executes the generated image processing program and determines whether the image processing program has to be regenerated.

Here, in the case where the program generation device 200 and the image processing device 300 respectively have the program generation function and the program execution function provided to the image processing device 100a according to the third embodiment, the configuration of FIG. 18 is modified as follows. The program generation device 200 includes the reference information calculation unit 123a instead of the reference information calculation unit 123. The image processing device 300 includes the reference information storage unit 114a, the intermediate processing result storage unit 115a, and the determination processing unit 125a instead of the reference information storage unit 114, the intermediate processing result storage unit 115, and the determination processing unit 125.

Fifth Embodiment

Figure 19:
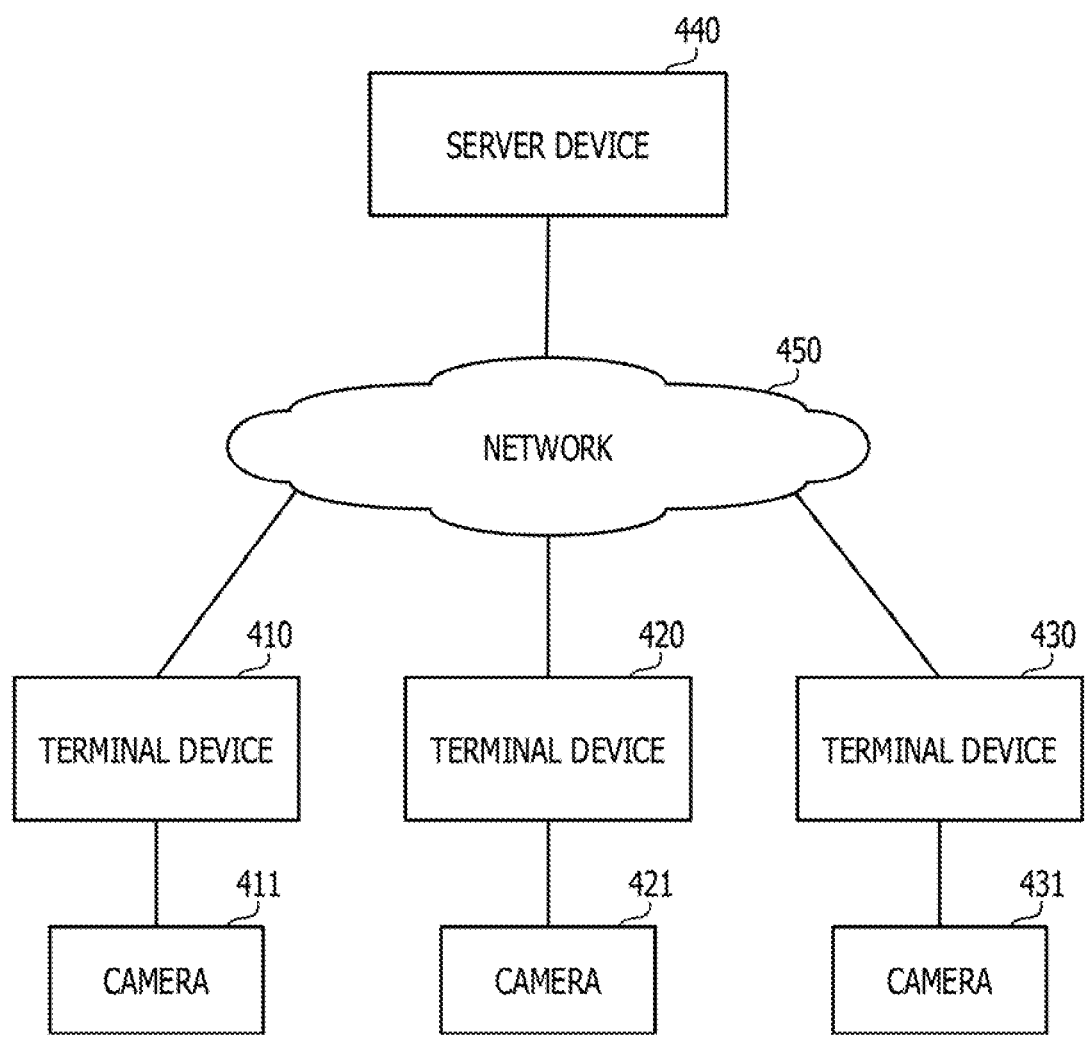
FIG. 19 is a diagram illustrating a configuration example of an image processing system according to a fifth embodiment.

FIG. 19 is a diagram illustrating a configuration example of an image processing system according to a fifth embodiment. The image processing system according to the fifth embodiment includes a plurality of terminal devices 410, 420, and 430 and a server device 440. The terminal devices 410, 420, and 430 are connected to the server device 440 via a network 450. Further, cameras 411, 421, and 431 are respectively connected to the terminal devices 410, 420, and 430. Here, the terminal devices 410, 420, and 430 and the server device 440 are feasible as a computer having the hardware configuration illustrated in FIG. 2, for example.

In the image processing system having the configuration illustrated in FIG. 19, each processing function of the image processing device 100 according to the second embodiment or the image processing device 100a according to the third embodiment may be realized. For example, the server device 440 is provided with the processing functions of the image processing device 100 or the image processing device 100a. In this case, the server device 440 acquires captured images captured by the cameras 411, 421, and 431 via the terminal devices 410, 420, and 430, respectively. Further, the server device 440 separately executes processing of the image processing device 100 or the image processing device 100a for each of the cameras 411, 421, and 431. Alternatively, the server device 440 may commonly execute generation processing of an image processing program and reference information.

Further, as another example, the processing functions of the program generation device 200 in FIG. 18 may be realized at the server device 440 and the processing functions of the image processing device 300 may be realized at the terminal devices 410, 420, and 430. In this case, the processing functions of the program generation device 200 may be separately realized for each of the terminal devices 410, 420, and 430 or commonly realized, for example. In the latter case, an image processing program and reference information which are generated in a shared manner in the server device 440 are distributed to the terminal devices 410, 420, and 430.

Here, the processing functions of the devices illustrated in each of the above-described embodiments (the image processing devices 1, 100, 100a, 300, the program generation device 200, the terminal devices 410, 420, 430, and the server device 440) may be realized by a computer. In this case, a program in which processing contents of functions to be provided to each device are described is provided and the program is executed by the computer, whereby the above-described processing functions are realized on the computer. The program in which the processing contents are described may be preliminarily recorded in a computer readable recording medium. Examples of the computer readable recording medium include a magnetic storage device, an optical disk, a magnetooptical recording medium, and a semiconductor memory. Examples of the magnetic storage device include a hard disk device (HDD), a flexible disk (FD), and a magnetic tape. Examples of the optical disk include digital versatile disc (DVD), a DVD-RAM, a compact disc-read only memory (CD-ROM), and a CD-recordable (R)/rewritable (RW). Examples of the magnetooptical recording medium include a magneto-optical disk (MO).

When a program is distributed, portable recording media such as DVDs and CD-ROMs in which the program is recorded are sold, for example. Further, the program may be preliminarily stored in a storage device of a server computer and the program may be transferred from the server computer to other computers via a network.

A computer executing a program stores the program recorded in a portable recording medium or the program transferred from the server computer, for example, in a storage device thereof. Then, the computer reads the program from the storage device thereof and executes processing following the program. Here, the computer may directly read the program from the portable recording medium and execute processing following the program. Further, whenever a program is transferred from the server computer connected via the network, the computer may execute processing following the received program in sequence.

The above description merely illustrates the principle of the present disclosure. Further, it is possible for those skilled in the art to make many modifications and alterations, and the present disclosure is not limited to the precise configuration and application examples illustrated and described above, but all corresponding modifications and equivalents are considered to be within the scope of the present disclosure according to the accompanied claims and their equivalents.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory configured to store an image processing program having a tree structure in which a partial program is incorporated in each of a plurality of nodes; and
   a processor configured to performs, based on the image processing program, operations of;
   calculating a feature amount based on a processing result in each intermediate node excluding a terminal node among the plurality of nodes when executing image processing on a captured image which is captured by an imaging device; and
   calculating a performance evaluation value of the image processing program based on a variation amount of the feature amount in accordance with elapse of time,
   wherein the processor:
   performs initial image processing on an input image which is used in regeneration of the image processing program by genetic programming;
   calculates an initial feature amount based on the processing result in the each intermediate node;
   calculates a distance between the feature amount and the initial feature amount as the performance evaluation value, in a calculation of the performance evaluation value;
   calculates a node feature amount for the each intermediate node based on the processing result in the each intermediate node;
   calculates a threshold value based on an index representing a variation degree of the node feature amount;
   determines whether the image processing program is to be regenerated by the genetic programming, based on comparison between the distance and the threshold value; and
   regenerate, when the distance is larger than the threshold value, the image processing program by the genetic programming using, as new training data, captured images which are input during an execution of the image processing program a last plurality of times.

2. The image processing apparatus according to claim 1, wherein in a calculation of the performance evaluation value, an index representing a variation degree of the feature amount which is calculated in each of the last multiple times of execution of the image processing is calculated as the performance evaluation value.

3. The image processing apparatus according to claim 1, wherein in a calculation of the feature amount, a node feature amount is calculated for the each intermediate node by a calculation method which differs depending on a kind of the partial program which is incorporated in the each intermediate node, and the feature amount is calculated based on the node feature amount.

4. An information processing method comprising:
   calculating, by a computer, based on an image processing program having a tree structure in which a partial program is incorporated in each of a plurality of nodes, a feature amount based on a processing result in each intermediate node excluding a terminal node among the plurality of nodes when executing image processing on a captured image which is captured by an imaging device;
   calculating a performance evaluation value of the image processing program based on a variation amount of the feature amount in accordance with elapse of time;

performing initial image processing on an input image which is used in regeneration of the image processing program by genetic programming;
calculating an initial feature amount based on the processing result in the each intermediate node;
calculating a distance between the feature amount and the initial feature amount as the performance evaluation value, in a calculation of the performance evaluation value;
calculating a node feature amount for the each intermediate node based on the processing result in the each intermediate node;
calculating a threshold value based on an index representing a variation degree of the node feature amount;
determining whether the image processing program is to be regenerated by the genetic programming, based on comparison between the distance and the threshold value; and
regenerating, when the distance is larger than the threshold value, the image processing program by the genetic programming using, as new training data, captured images which are input during an execution of the image processing program a last plurality of times.

5. The image processing method according to claim 4, wherein in the calculating the performance evaluation value, an index representing a variation degree of the feature amount which is calculated in each of the last multiple times of execution of the image processing is calculated as the performance evaluation value.

6. The image processing device according to claim 4, wherein in the calculating the feature amount, a node feature amount is calculated for the each intermediate node by a calculation method which differs depending on a kind of the partial program which is incorporated in the each intermediate node, and the feature amount is calculated based on the node feature amount.

7. A non-transitory computer-readable recording medium recording an image processing program which causes a computer to perform a process, the process comprising:
calculating based on the image processing program having a tree structure in which a partial program is incorporated in each of a plurality of nodes, a feature amount based on a processing result in each intermediate node excluding a terminal node among the plurality of nodes when executing image processing on a captured image which is captured by an imaging device;
calculating a performance evaluation value of the image processing program based on a variation amount of the feature amount in accordance with elapse of time;
performing initial image processing on an input image which is used in regeneration of the image processing program by genetic programming;
calculating an initial feature amount based on the processing result in the each intermediate node;
calculating a distance between the feature amount and the initial feature amount as the performance evaluation value, in a calculation of the performance evaluation value;
calculating a node feature amount for the each intermediate node based on the processing result in the each intermediate node;
calculating a threshold value based on an index representing a variation degree of the node feature amount;
determining whether the image processing program is to be regenerated by the genetic programming, based on comparison between the distance and the threshold value; and
regenerating, when the distance is larger than the threshold value, the image processing program by the genetic programming using, as new training data, captured images which are input during an execution of the image processing program a last plurality of times.

8. The non-transitory computer-readable recording medium according to claim 7, wherein in the calculating the performance evaluation value, an index representing a variation degree of the feature amount which is calculated in each of the last multiple times of execution of the image processing is calculated as the performance evaluation value.

* * * * *